(12) United States Patent
Menn

(10) Patent No.: US 10,016,032 B1
(45) Date of Patent: *Jul. 10, 2018

(54) HANDY CANE WALKING CANE WITH INTEGRATED GRASPER TOOL

(71) Applicant: Pavel Menn, Salem, MA (US)

(72) Inventor: Pavel Menn, Salem, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,496

(22) Filed: Sep. 26, 2017

Related U.S. Application Data

(63) Continuation-in-part of application No. 15/407,825, filed on Jan. 17, 2017, now Pat. No. 9,770,079.

(60) Provisional application No. 62/445,718, filed on Jan. 12, 2017.

(51) Int. Cl.
| | |
|---|---|
| *A45B 3/00* | (2006.01) |
| *A45B 9/04* | (2006.01) |
| *B25J 1/04* | (2006.01) |
| *A45B 9/02* | (2006.01) |
| *A61H 3/02* | (2006.01) |

(52) U.S. Cl.
CPC ............... *A45B 3/00* (2013.01); *A45B 9/02* (2013.01); *A45B 9/04* (2013.01); *B25J 1/04* (2013.01); *A61H 2003/0222* (2013.01)

(58) Field of Classification Search
CPC ..... B25J 1/04; A45B 3/00; A45B 9/00; A45B 9/04; A45B 9/02; A61H 3/0288
USPC ......... 135/65–66, 72, 75–76, 77, 80–81, 84; 294/198, 200, 104
See application file for complete search history.

(56) References Cited

U.S. PATENT DOCUMENTS

| | | | | |
|---|---|---|---|---|
| 465,222 | A * | 12/1891 | Ulbricht | B66C 1/48 294/104 |
| 3,265,429 | A * | 8/1966 | Shatt | B25J 1/04 294/104 |
| 3,467,116 | A * | 9/1969 | Ringewaldt | A45B 3/00 135/66 |
| 4,056,278 | A * | 11/1977 | Bau | E01H 1/1206 294/1.4 |
| 4,225,169 | A * | 9/1980 | DeToma | B25J 1/04 294/1.4 |
| 6,058,953 | A * | 5/2000 | Stefanelli | A45B 3/00 135/66 |
| 6,386,216 | B1 * | 5/2002 | Cubelli | A61H 3/02 135/66 |
| 7,934,756 | B2 * | 5/2011 | Kroeze | B25J 1/04 294/115 |
| 8,122,900 | B1 * | 2/2012 | Hayes | A45B 9/04 135/66 |
| 8,978,677 | B2 * | 3/2015 | Roberts | A45B 3/00 135/66 |
| 9,004,563 | B2 * | 4/2015 | Buzby | A47F 13/06 294/115 |
| 9,161,595 | B2 * | 10/2015 | Riemer | A45B 3/04 |
| 9,370,226 | B2 * | 6/2016 | Dole | A45B 3/00 |

* cited by examiner

*Primary Examiner* — Winnie S Yip
(74) *Attorney, Agent, or Firm* — Daniel N. Smith

(57) ABSTRACT

A lightweight, stable walking cane that contains an integrated grasper tool to extend a user's reach to pick up objects. The cane contains two configurations, a closed walking cane configuration for stability and balance, and an unlocked configuration with an open grasper tool for grasping objects.

14 Claims, 26 Drawing Sheets

HANDY CANE WALKING CANE WITH INTEGRATED GRASPER TOOL

CROSS REFERENCE TO RELATED APPLICATION

This application is a continuation-in-part and claims priority to U.S. patent application Ser. No. 15/407,825, filed Jan. 17, 2017, and further claims the benefit of U.S. Provisional Patent Application No. 62/445,718 filed on Jan. 12, 2017, the contents of which are incorporated herein by reference.

FIELD OF THE INVENTION

This invention relates a lightweight walking cane that contains an integrated grasper tool to extend a user's reach to pick up objects.

BACKGROUND OF INVENTION

A walking cane is a device that provides stability and balance to a user when walking, standing, or sitting. Previous canes include features and accessories that conveniently provide additional functions to users, including the ability to reach and grasp distant objects.

Reaching and grasping objects on the ground, the floor, or high shelves is an important daily function for people. Unfortunately, due to injuries, surgeries, heights, disabilities, age, or other infirmities, a person may not have the strength, mobility, flexibility, stability, or balance needed to reach items to extend and grab items located on lower or higher surfaces.

Previous canes contain accessories intended to assist a person to grasp items out of his or her reach. These canes contain attached grabbers with a gripping mechanism, usually in the form of a claw, pincer, tab, or suction cup, to grab a desired item. A user must operate a separate mechanism to actuate the attached grabbers.

Additional, other previous canes are grabber hand tools roughly configured into the shape of a cane.

Problems arise with these previous canes. The addition of a grabber tool or designing grabber tools into a cane configuration both affect the strength, integrity, and usability of the devices as a walking cane for stability and balance.

The present invention avoids the need to separately carry a cane and a hand grabber tool. It also avoids elaborate accessories or configurations that affect the stability of the walking cane, while maintaining a strong grabbing mechanism.

SUMMARY OF THE INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The subject invention discloses a lightweight walking cane with a concealable grasper comprising: a top handle on a proximal end of the cane, the handle including a spring loaded trigger; the concealable grasper on a distal end of the cane, wherein the grasper comprises two wrist halfs, a grasper spring, a grasper actuator, two proximal phalanges, two ligaments, two distal phalanges, and two half boots, wherein the two half boots each have an internal face, wherein the internal faces have complementary interlocking shapes with each other; an internal rod operatively attached to the spring loaded trigger, wherein the internal rod extends from the spring loaded trigger on a proximal end and is operatively attached to the grasper actuator on a distal end; a structural support tubing having a cane axis about the internal rod and attached to the handle, wherein the structural support tubing extends in a substantially straight direction from the handle on a proximal end to the two wrist halfs on a distal end; a slidable sleeve comprising two joint halves, each sleeve joint half comprising proximal and distal detents imbedded in sleeve joint halfs; a slidable external tubing attached to sleeve joint halfs along structural support tubing, wherein the external tubing extends about the structural support tubing from the sleeve to the two wrist halfs on the distal end; wherein in a closed configuration of the cane, the external tubing covers the two proximal phalanges, the two ligaments and the two distal phalanges in a substantially straight position that is substantially parallel with the structural support tubing, and the complementary interlocking internal faces of the two half boots are joined so as to form a ground contact end for the cane; wherein sliding the sleeve and the external tubing in a proximal direction on the structural support tubing uncovers the two proximal phalanges, the two ligaments and the two distal phalanges, and releases them for opening the grasper by the grasper spring, wherein as the two ligaments rotate to the open position they slide the grasper actuator and the internal rod distally away from the spring loaded trigger, releasing the trigger on the handle and rotating the two proximal phalanges and the two ligaments outwardly away from the cane axis in a substantially symmetrical position to each other, further wherein the two distal phalanges and the two half boots extend outwardly away from the cane axis in a substantially symmetrical position with each other while remaining parallel with the structural support tubing to form an unlocked configuration of the grasper with an open grasper; wherein in the unlocked open configuration, applying a force to pull the trigger towards the handle moves the internal rod proximally towards the spring loaded trigger to activate the grasper actuator and rotate the two proximal phalanges and the two ligaments inwardly in a substantially symmetric position with each other, and wherein the two distal phalanges and the two half boots close up inwardly towards the cane axis in a substantially symmetric position with each other while remaining parallel to the structural support tubing to grasp an object.

The subject invention also discloses a combination cane and grabber tool comprising: an elongated cane body comprising a structural support tubing having a cane axis, a proximal end and a distal end; a handle on the proximal end of the cane, the handle including a trigger; a concealable grasper on a distal end of the cane, wherein the grasper comprises an actuator, a wrist, a first proximal phalange, a first ligament, a first distal phalange, a first half boot, a second proximal phalange, a second ligament, a second distal phalange, a second half boot; an internal rod operatively attached to the trigger at a proximal end, wherein the internal rod extends from the trigger on the proximal end and is operatively attached to actuator on a distal end; a sleeve and a distal external tubing capable of sliding on the structural support tubing, wherein the sleeve and the external tubing are configured to slide proximally to unlock the grasper for opening; wherein in a closed position of the grabber tool, the sleeve and the external tubing are detained in a distal position, further wherein the first proximal phalange, the first ligament, the first distal phalange, the second proximal phalange, the second ligament, and the second distal phalange are all covered by the external tubing in a substantially straight position that is substantially parallel with the structural support tubing, further wherein the first and second half boots each have an internal face that are complementary and interlocking to each other, and are joined to form the ground support end for the cane; wherein an unlocked position of the grabber tool is achieved by sliding the sleeve and the external tubing in the proximal direction, which uncovers the first proximal phalange, the first ligament, the first distal phalange, the second proximal phalange, the second ligament, and the second distal phalange; wherein the internal rod is moved in a distal direction to allow the actuator to open the grasper by rotating the first proximal phalange and the first ligament outwardly away from the cane axis, and rotating the second proximal phalange and the second ligament outwardly away from the cane axis, wherein the first proximal phalange and the first ligament extend outwardly in a direction that is opposite to the outward direction of the second proximal phalange and the second ligament, wherein the distal movement of the internal rod also rotates the trigger away from the handle; wherein in a grasping position of the cane and grabber tool, when the trigger is pulled towards the handle with force, pulling the internal rod in the proximal direction, which activates the actuator to rotate the first proximal phalange and the first ligament inwardly towards the cane axis, and rotates the second proximal phalange and the second ligament inwardly towards the cane axis, wherein the first proximal phalange and the first ligament rotate inwardly in a direction that is substantially aligned and opposite to the inward direction of the second proximal phalange and the second ligament thereby closing the grasper; and wherein the first distal phalange and the first half boot move inwardly towards the cane axis, and the second distal phalange and the second half boot move inwardly towards the cane axis, in parallel to the cane axis.

The subject invention further discloses a lightweight walking cane with a concealable grasper comprising: a top handle, the handle including a spring loaded trigger; the concealable grasper on a distal end of the cane, wherein the grasper comprises, a grasper actuator, two proximal phalanges, two distal phalanges, and two half boots; an internal rod operatively attached to the spring loaded trigger, wherein the internal rod extends from the spring loaded trigger on a proximal end and is operatively attached to the grasper actuator on a distal end; a structural support tubing about the internal rod and extending from the handle to the grasper; a slidable sleeve on the structural support tubing; a slidable external tubing attached to the sleeve; wherein in a closed configuration of the cane, the external tubing covers the two proximal phalanges and the two distal phalanges in a substantially straight position that is substantially parallel with each other and the structural support tubing, and the two half boots are joined so as to form a ground contact end for the cane; wherein sliding the sleeve and the external tubing in a proximal direction on the structural support tubing uncovers the two proximal phalanges and the two distal phalanges, and allows the grasper to move the internal rod away from the handle and move the spring loaded trigger out of the handle, releasing the spring loaded trigger and rotating the two proximal phalanges outwardly away from the cane axis in a substantially symmetrical position with each other, further wherein the two distal phalanges and the two half boots extend outwardly away from the cane axis in a substantially symmetrical position while remaining substantially parallel with the structural support tubing to form an unlocked configuration of the cane with an open grasper; wherein in the unlocked configuration, applying a force to pull the spring loaded trigger towards the handle moves the internal rod in a proximal direction to activate the grasper actuator and retract the two proximal phalanges inwardly in a substantially symmetrical position with each other; and wherein the two distal phalanges and the two half boots retract inwardly towards the cane axis in a substantially symmetrical position with each other to grasp an object.

The subject invention further discloses a lightweight walking cane with a concealable grasper comprising: a handle including a spring loaded trigger; the concealable grasper on a distal end of the cane, the grasper including a grasper actuator, two proximal phalanges, two distal phalanges, and two half boots; an internal rod attached to the spring loaded trigger and the grasper; a structural support tubing about the internal rod and extending from the handle to the grasper; a slidable sleeve on the structural support tubing; a slidable external tubing about the structural support tubing extending to the grasper; wherein sliding the sleeve and the external tubing in a distal direction closes the grasper of the cane by covering the two proximal phalanges and the two distal phalanges in a substantially straight position that is substantially parallel with each other and the structural support tubing, and the two half boots form a ground contact end for the cane; further wherein sliding the sleeve and the external tubing in a proximal direction unlocks the cane by uncovering the two proximal phalanges and the two distal phalanges, and moves the internal rod toward the grasper releasing the spring loaded trigger and rotating the two proximal phalanges outwardly away from the cane in a substantially symmetrical position with each other, wherein the two distal phalanges and the two half boots extend outwardly away from the cane in a substantially symmetrical position with each other while remaining substantially parallel with the structural support tubing to form an open grasper; wherein in the unlocked configuration, applying a force to pull the spring loaded trigger towards the handle moves the internal rod in a proximal direction to activate the grasper and retracts the two proximal phalanges, the two distal phalanges, and the two half boots inwardly in a substantially symmetrical positions with each other to grasp an object.

The subject invention further discloses a lightweight walking cane with a concealable grasper comprising: a handle including a spring loaded trigger for actuating the grasper on a distal end of the cane; a structural support tubing extending from the handle to the grasper; a sleeve and an external tubing on the structural support tubing, wherein sliding the sleeve and the external tubing in a distal direction covers and locks the grasper and solidifies the cane support, and sliding the sleeve and the external tubing in a proximal direction unlocks the grasper, releases the spring loaded trigger, and opens the grasper by uncovering and rotating the two proximal phalanges, and moving the two distal phalanges, and the two half boots outwardly away from the cane axis in a substantially symmetrical position with each other; wherein applying a force to pull the spring loaded trigger towards the handle retracts the two proximal phalanges, the two distal phalanges, and the two half boots inwardly in a substantially symmetrical position with each other to grasp an object.

In embodiments of the subject invention, the cane is moved back to the closed configuration by sliding the sleeve and the external tubing in a distal direction on the structural support tubing to move the internal rod proximally to retract the spring loaded trigger and activate the grasper actuator to retract the two proximal phalanges and the two ligaments inwardly in a substantially symmetrical position with each other, wherein the two distal phalanges and the two half boots retract inwardly towards the cane axis in a substantially symmetrical position with each other while remaining substantially parallel to the structural support tubing; and wherein as the sleeve and external tubing are fully extended in a distal direction, the external tubing covers the two proximal phalanges, the two ligaments and the two distal phalanges in a substantially straight position that is substantially parallel with the structural support tubing, and the complementary interlocking internal faces of the two half boots are joined so as to form the ground contact end for the cane.

In further embodiments of the subject invention, the cane further comprises a skid-resistant spherical surface on the ground contact end of the cane.

In other embodiments of the subject invention, the cane further comprises a plurality of complementary interlocking ridges on the internal faces of the two half boots.

In additional embodiments of the subject invention, the cane trigger further comprises a non-slip spherical gripping surface.

In embodiments of the subject invention, the term "substantially" is defined as at least close to (and can include) a given value or state, as understood by a person of ordinary skill in the art. In one embodiment, the term "substantially" refers to ranges within 10%, preferably within 5%, more preferably within 1%, and most preferably within 0.1% of the given value or state being specified.

In embodiments of the subject invention, the term "relatively" is defined as a comparison of a property, or the proportion of a property between two components.

There has thus been outlined, rather broadly, the more important features of the invention in order that the detailed description of an improved walking cane with a concealable grasper tool. There are additional features of the invention that will be described hereinafter and which will form the subject matter of the claims appended hereto. These together with other objects of the invention, along with the various features of novelty, which characterize the invention, are pointed out with particularity in the claims annexed to and forming a part of this disclosure.

BRIEF DESCRIPTION OF THE DRAWINGS

Advantages of the present invention will be apparent from the following detailed description of embodiments of an improved walking cane with a concealable grasper tool, which description should be considered in conjunction with the accompanying drawings, in which.

DETAILED DESCRIPTION OF THE EMBODIMENTS

Figure 1:
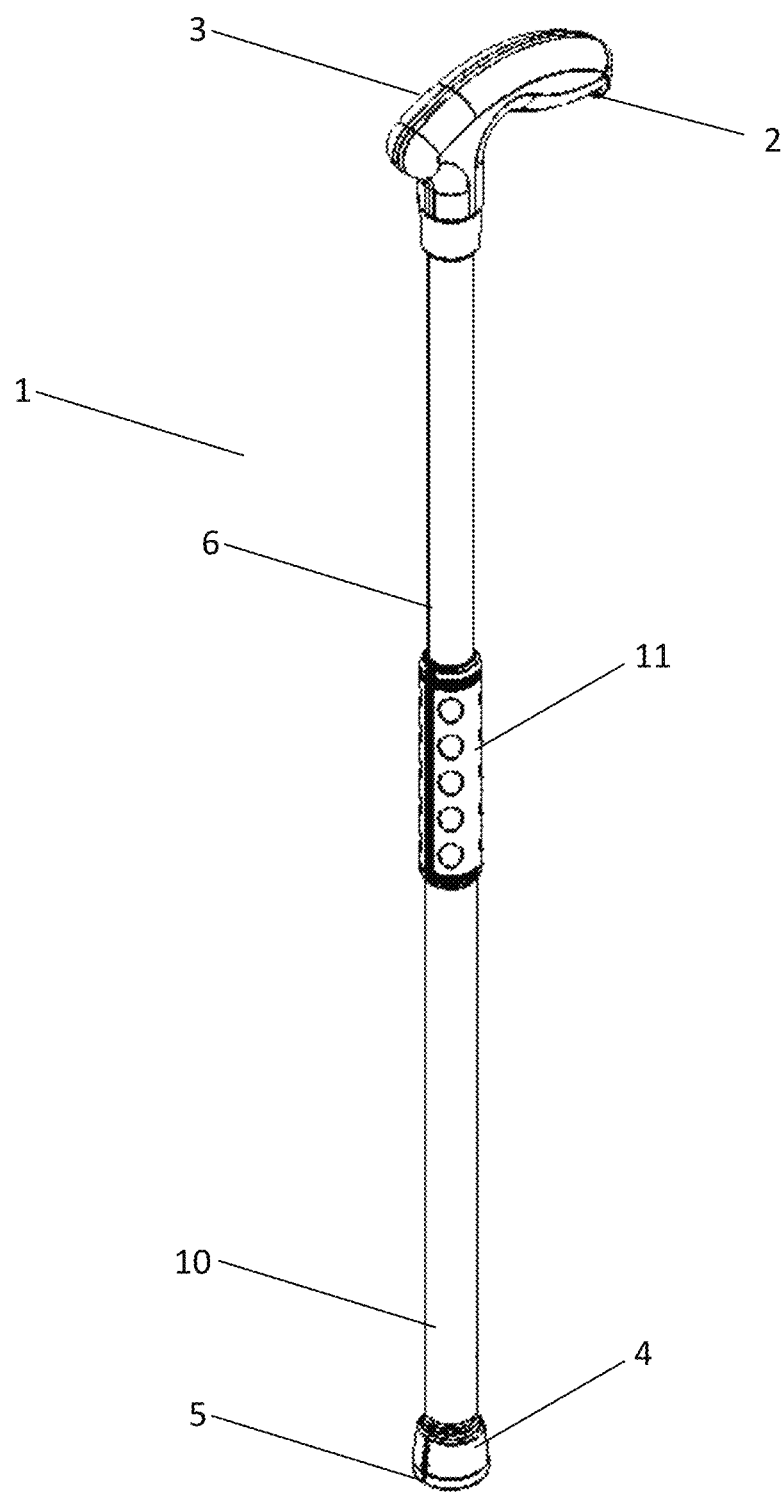
FIG. 1 illustrates a top isometric view of a Handy Cane walking cane with an integrated grasper tool in the closed configuration.
Figure 2:
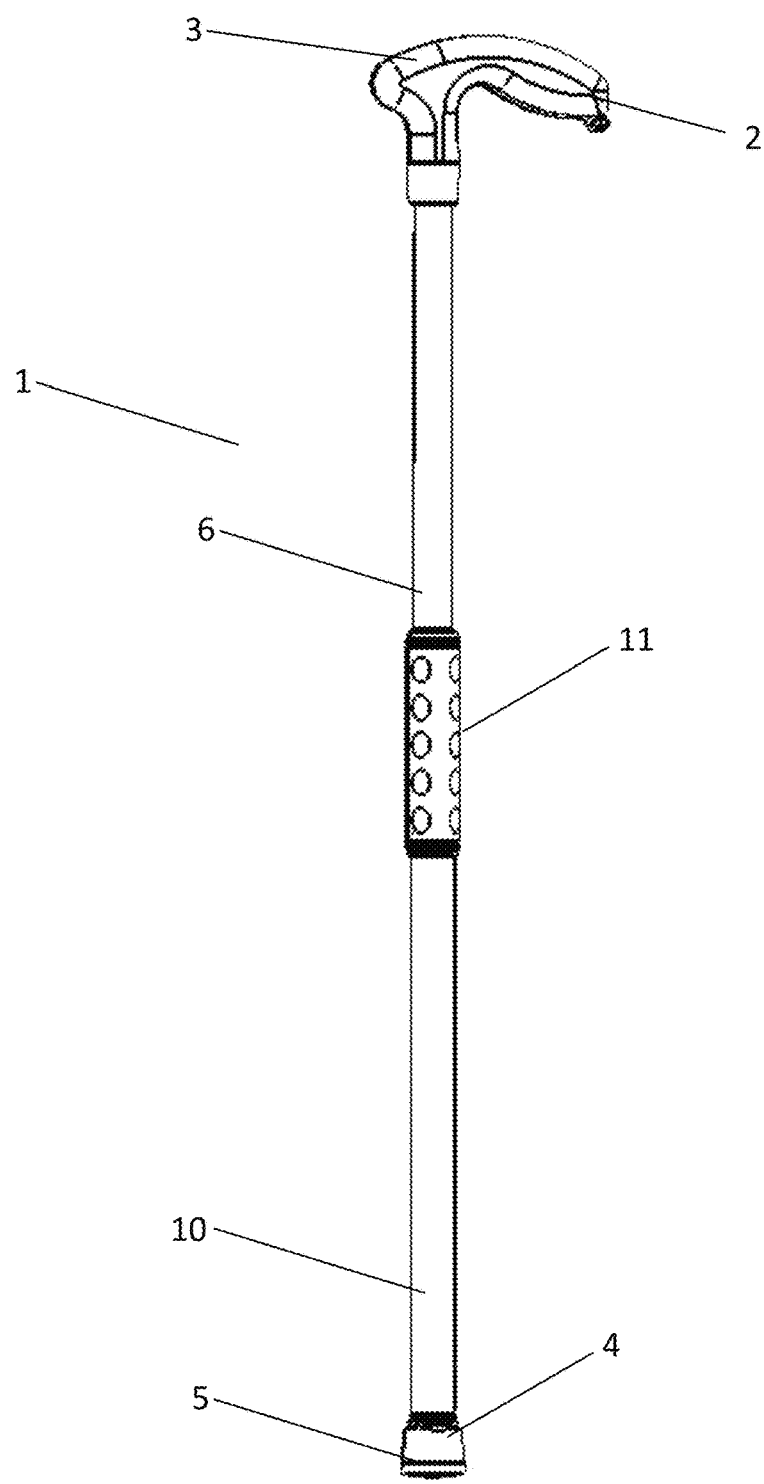
FIG. 2 illustrates a left side view of the Handy Cane walking cane in the closed configuration.
Figure 3:
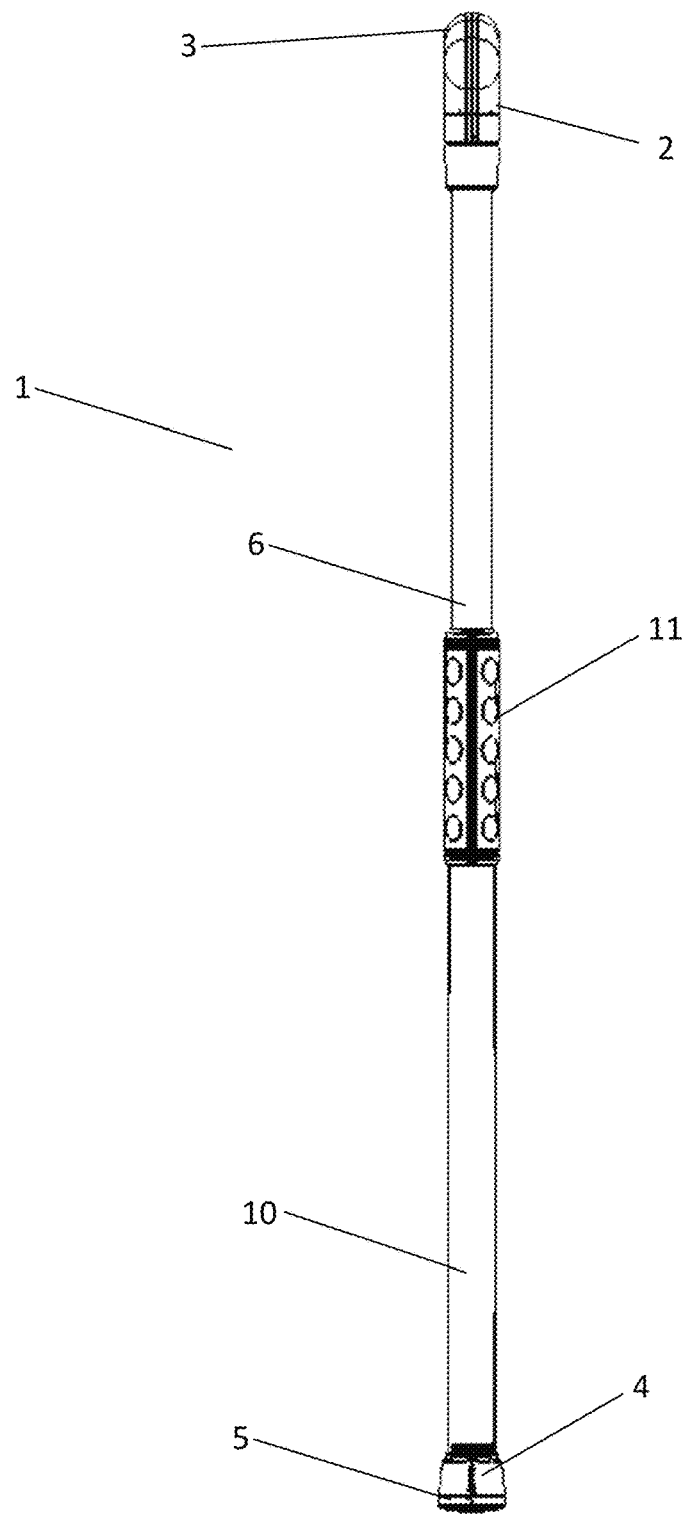
FIG. 3 illustrates a front view of the Handy Cane walking cane in the closed configuration.
Figure 4:
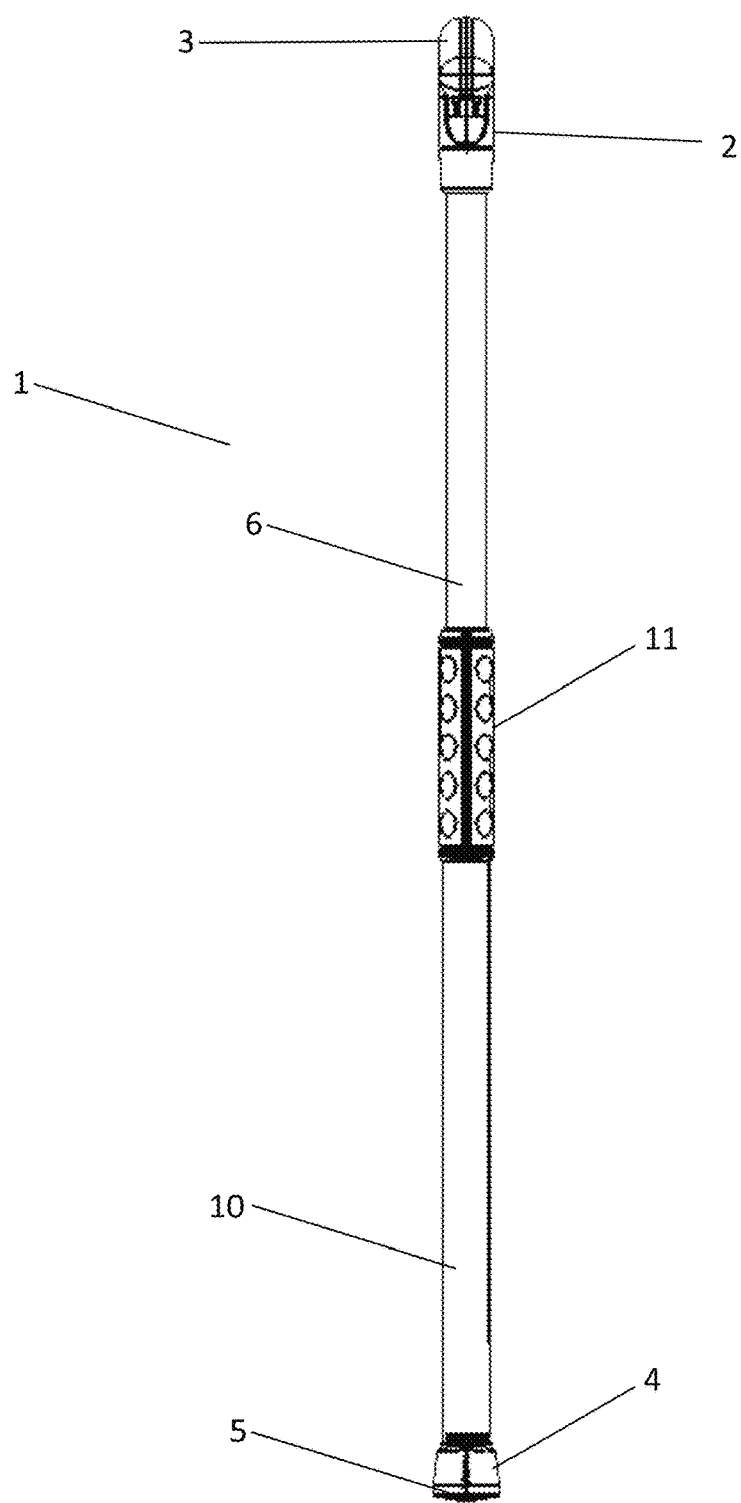
FIG. 4 illustrates a rear view of the Handy Cane walking cane in the closed configuration.
Figure 5:
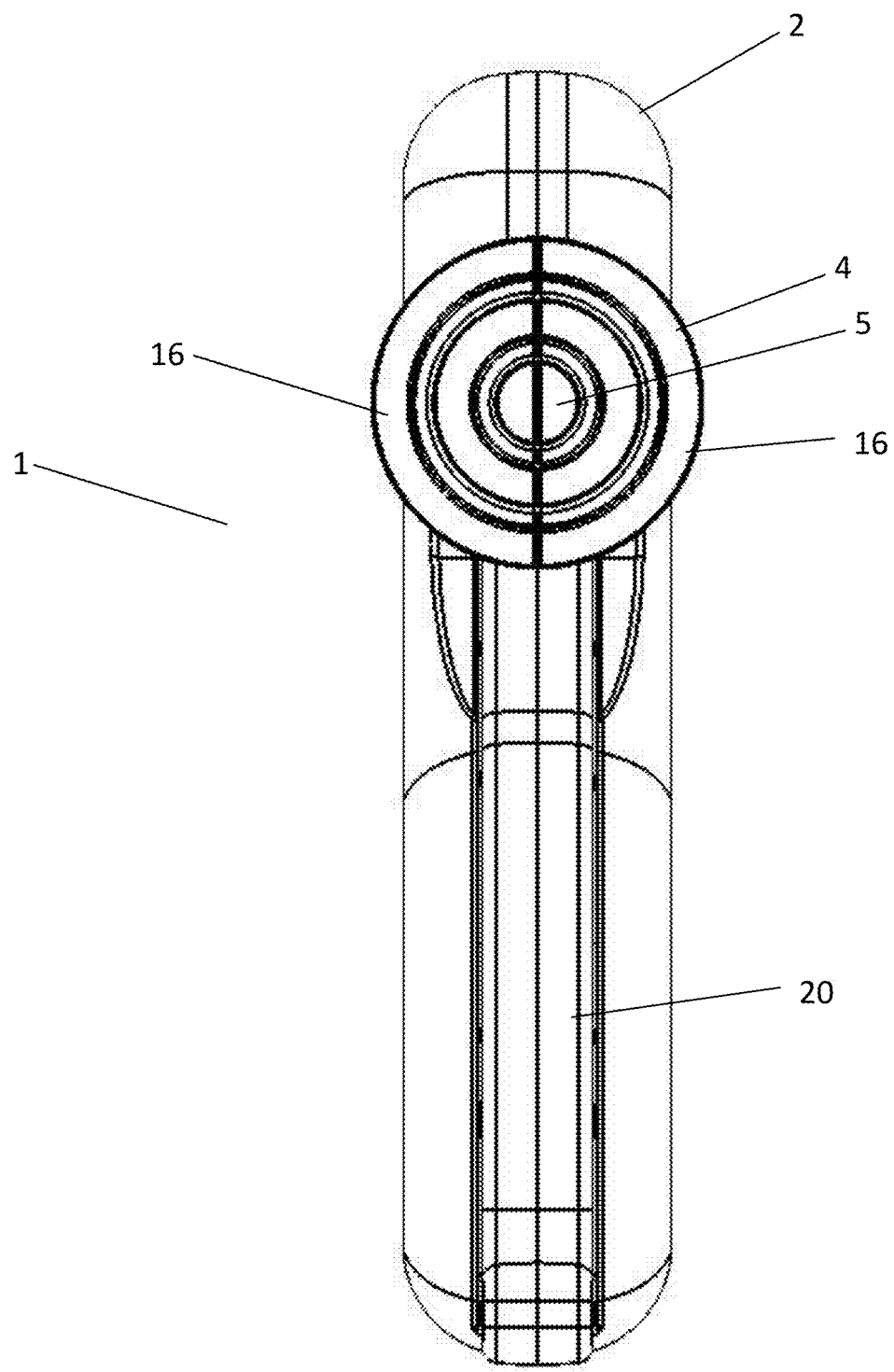
FIG. 5 illustrates a bottom view of the Handy Cane walking cane in the closed configuration.
Figure 6:
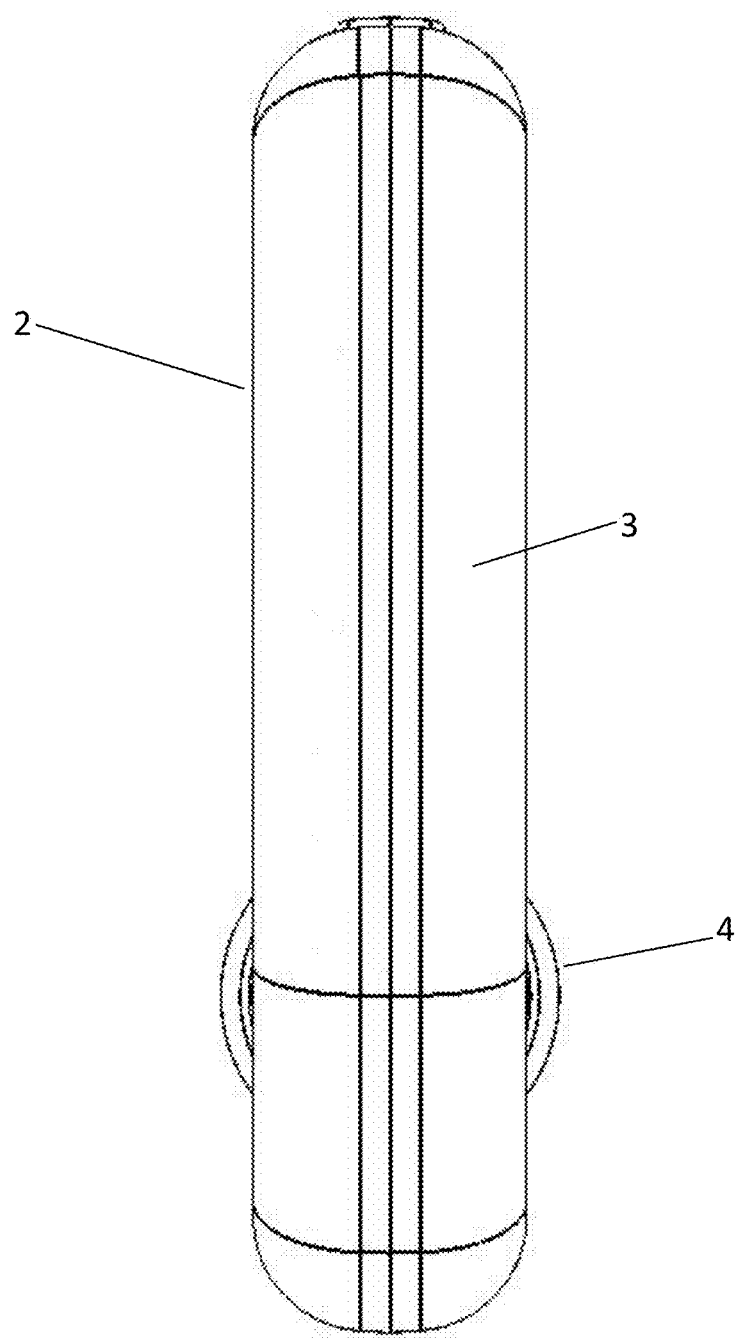
FIG. 6 illustrates a top view of the Handy Cane walking cane in the closed configuration.
Figure 7:
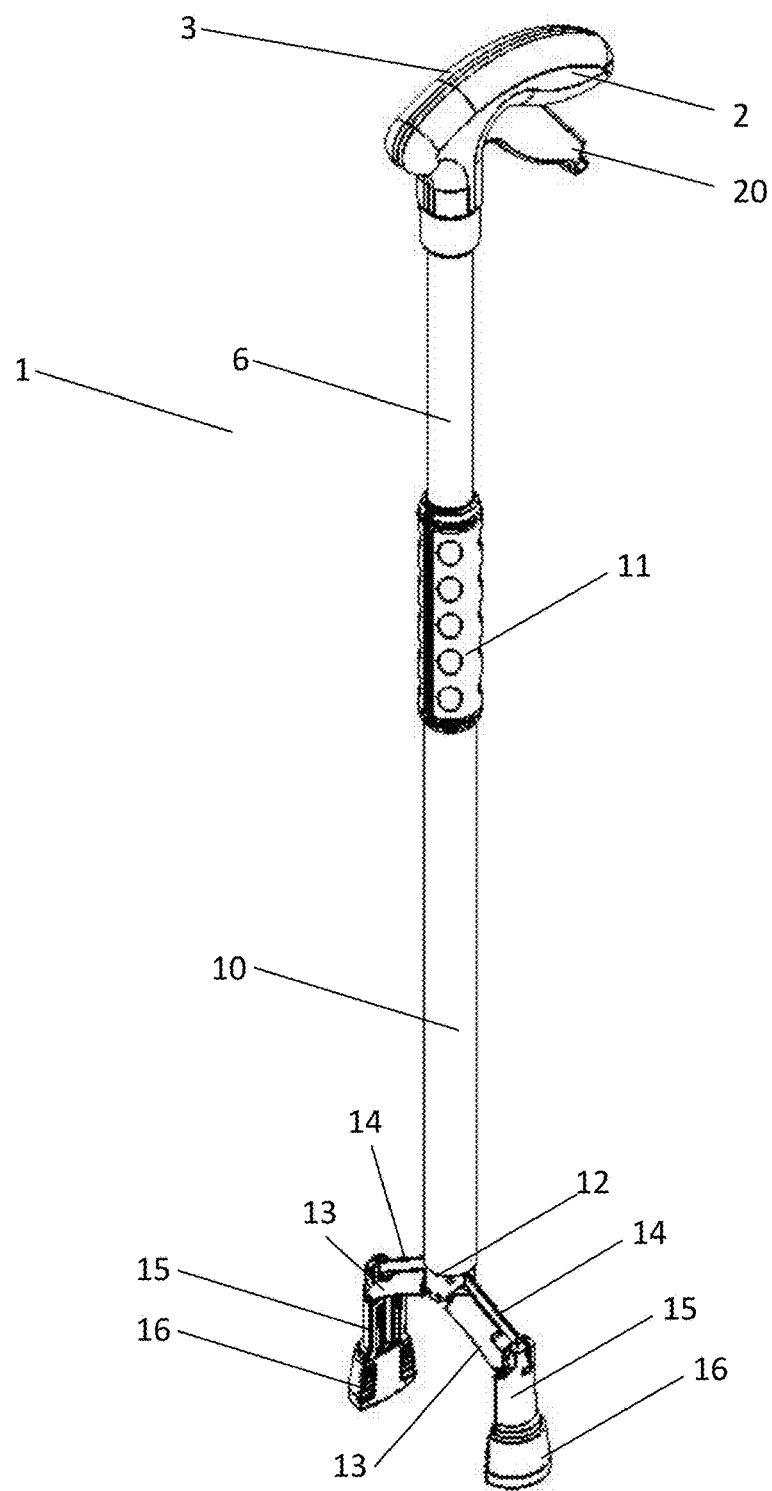
FIG. 7 illustrates a top isometric view of the Handy Cane walking cane with the integrated grasper tool in the open, non-clamped configuration.
Figure 8:
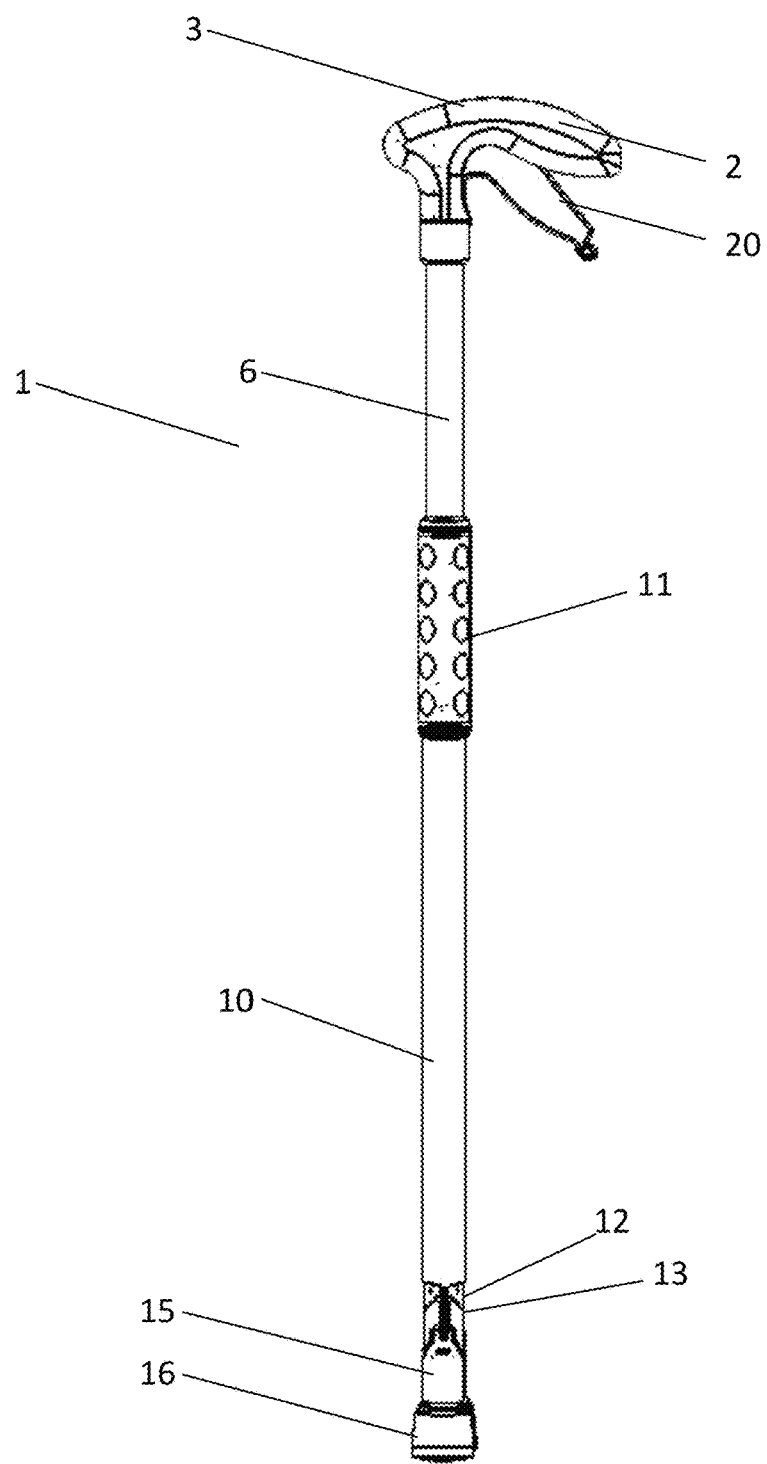
FIG. 8 illustrates a left side view of the Handy Cane walking cane with the integrated grasper tool in the open, non-clamped configuration.
Figure 9:
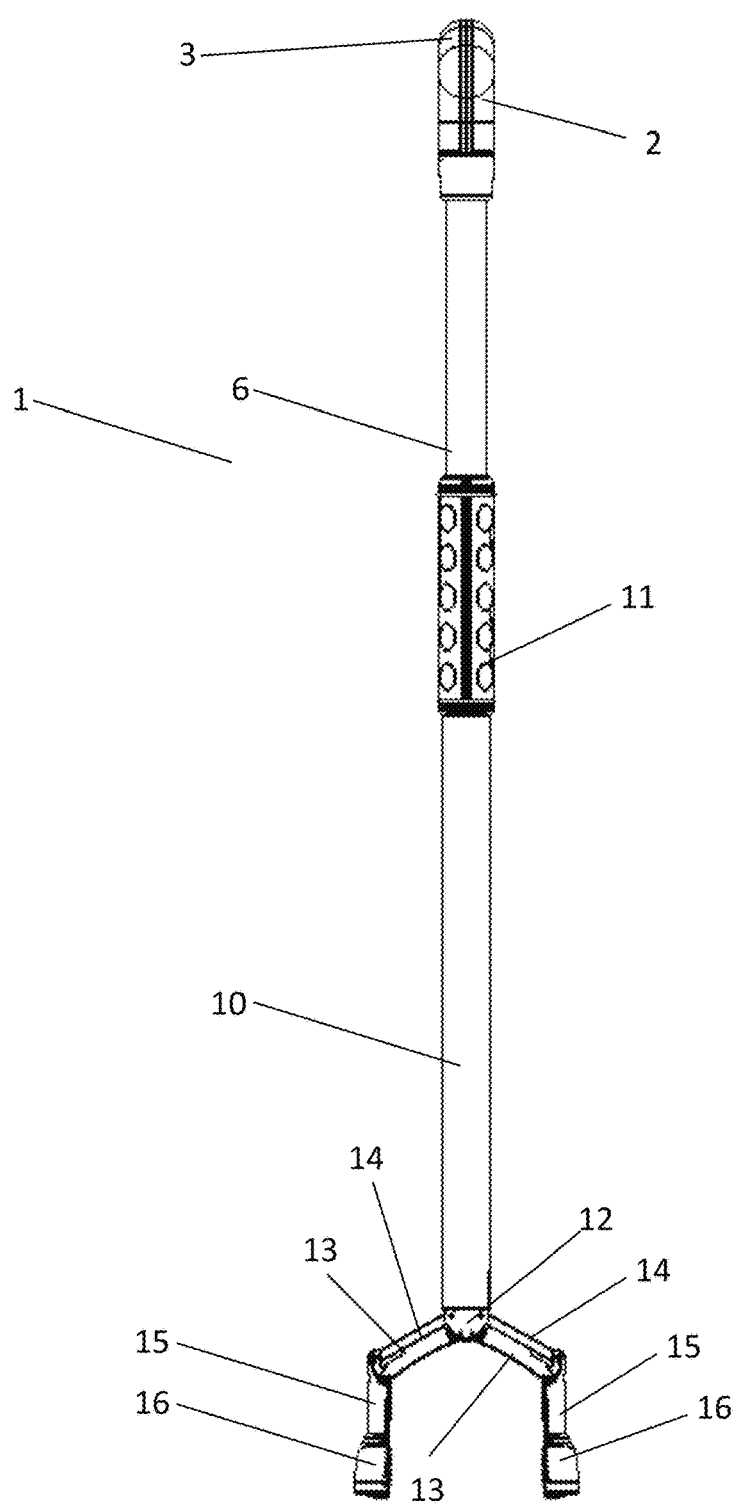
FIG. 9 illustrates a front view of the Handy Cane walking cane with the integrated grasper tool in the open, non-clamped configuration.
Figure 10:
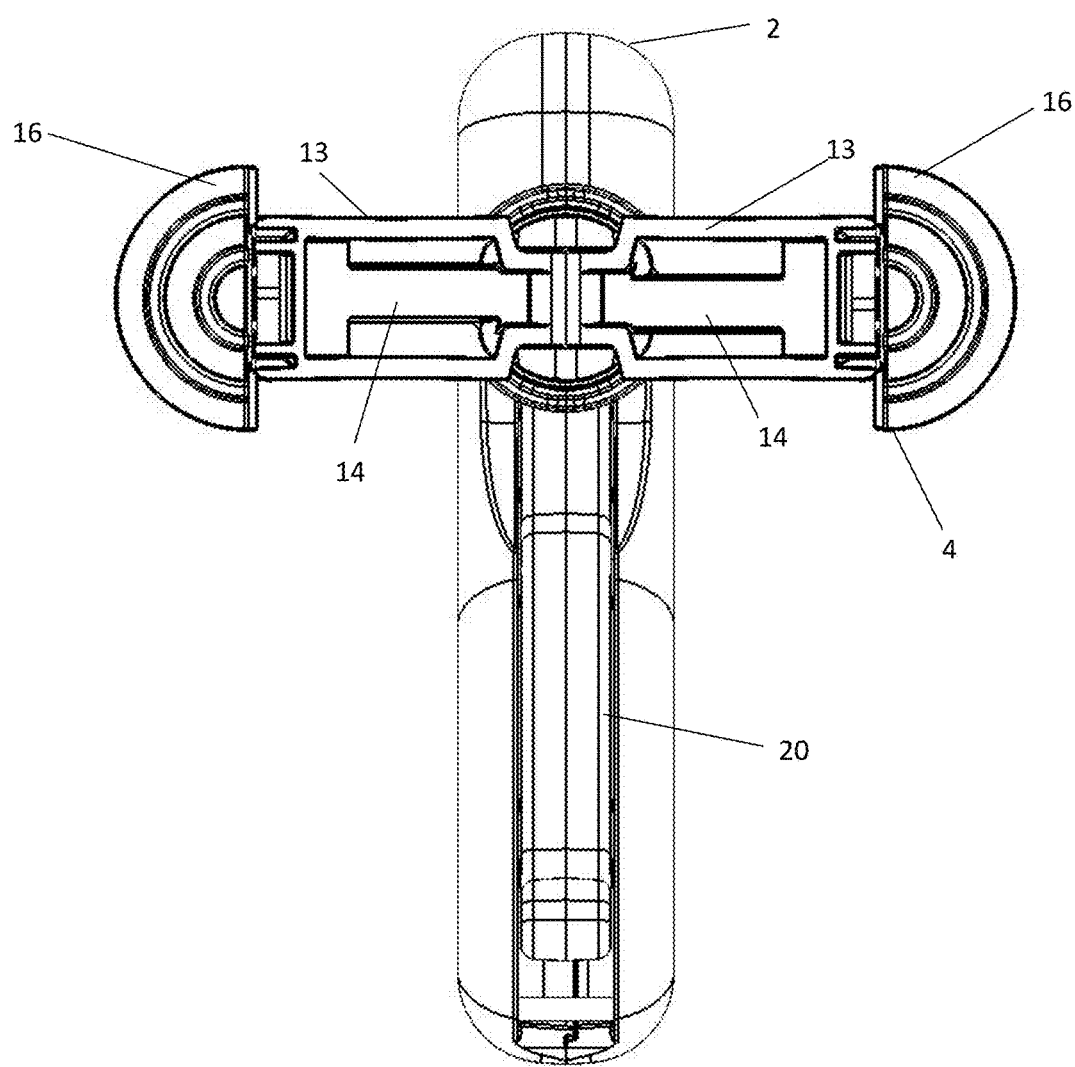
FIG. 10 illustrates a bottom view of the Handy Cane walking cane with the integrated grasper tool in the open, non-clamped configuration.
Figure 11:
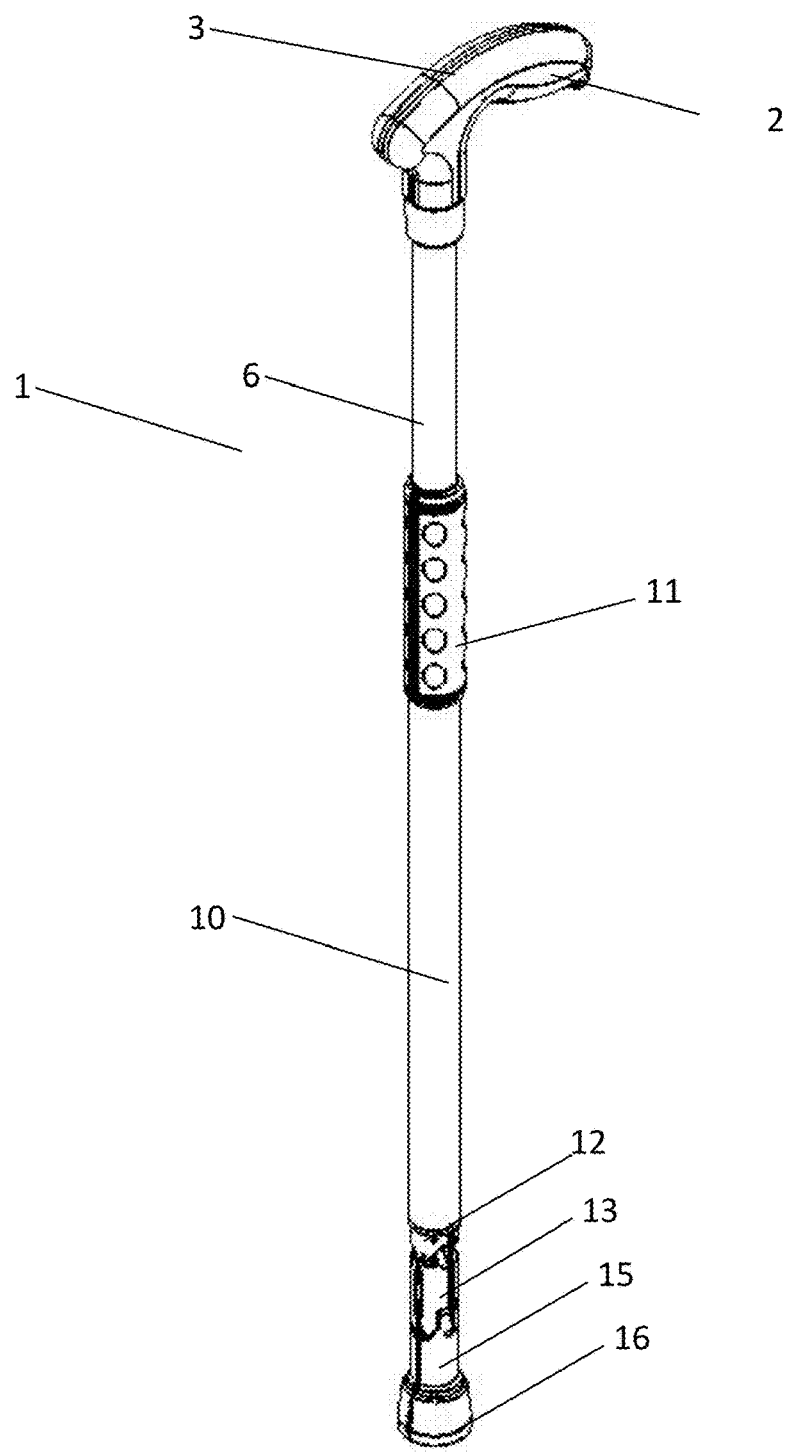
FIG. 11 illustrates a top isometric view of the Handy Cane walking cane with the integrated grasper tool in the clamped configuration.
Figure 12:
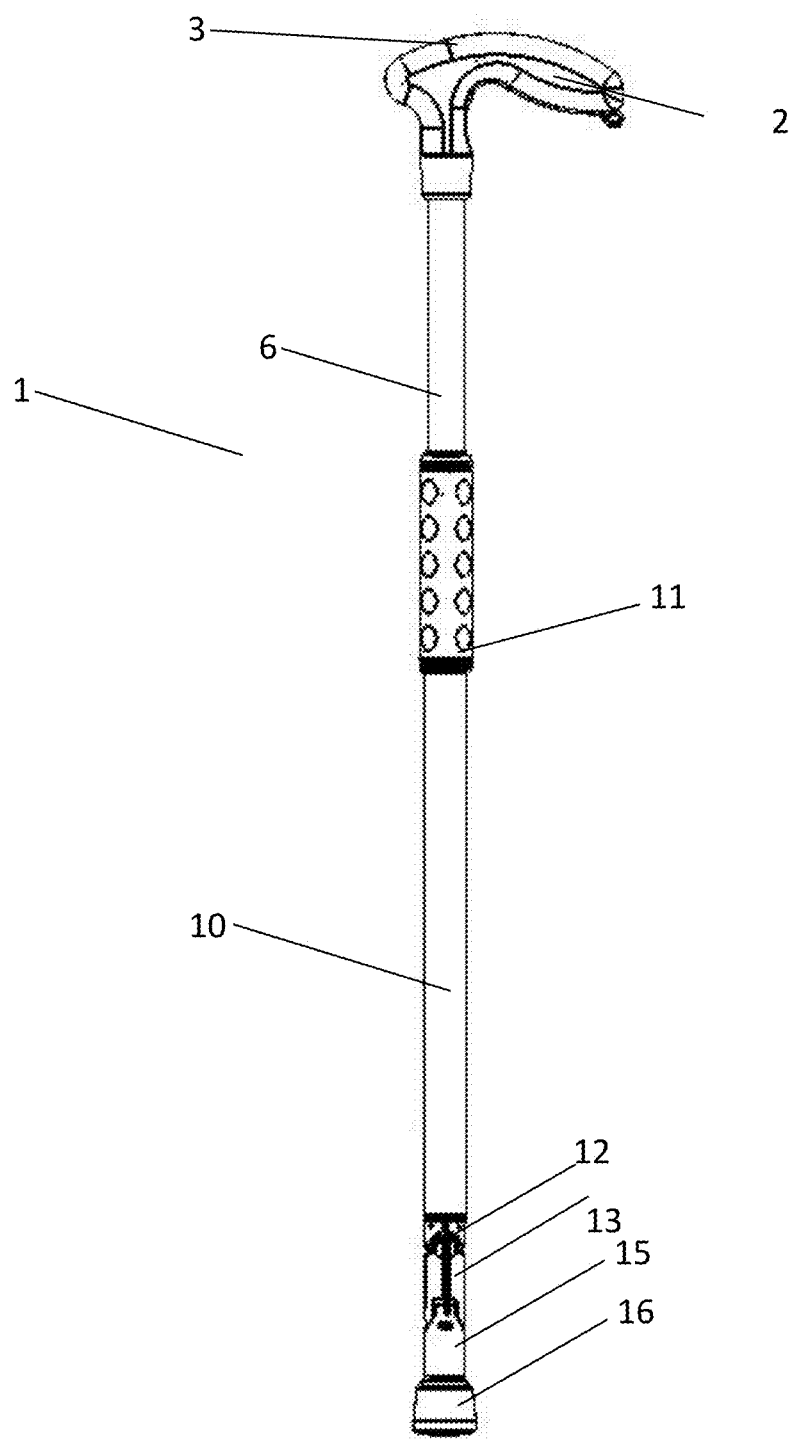
FIG. 12 illustrates a left side view of the Handy Cane walking cane with the integrated grasper tool in the clamped configuration.
Figure 13:
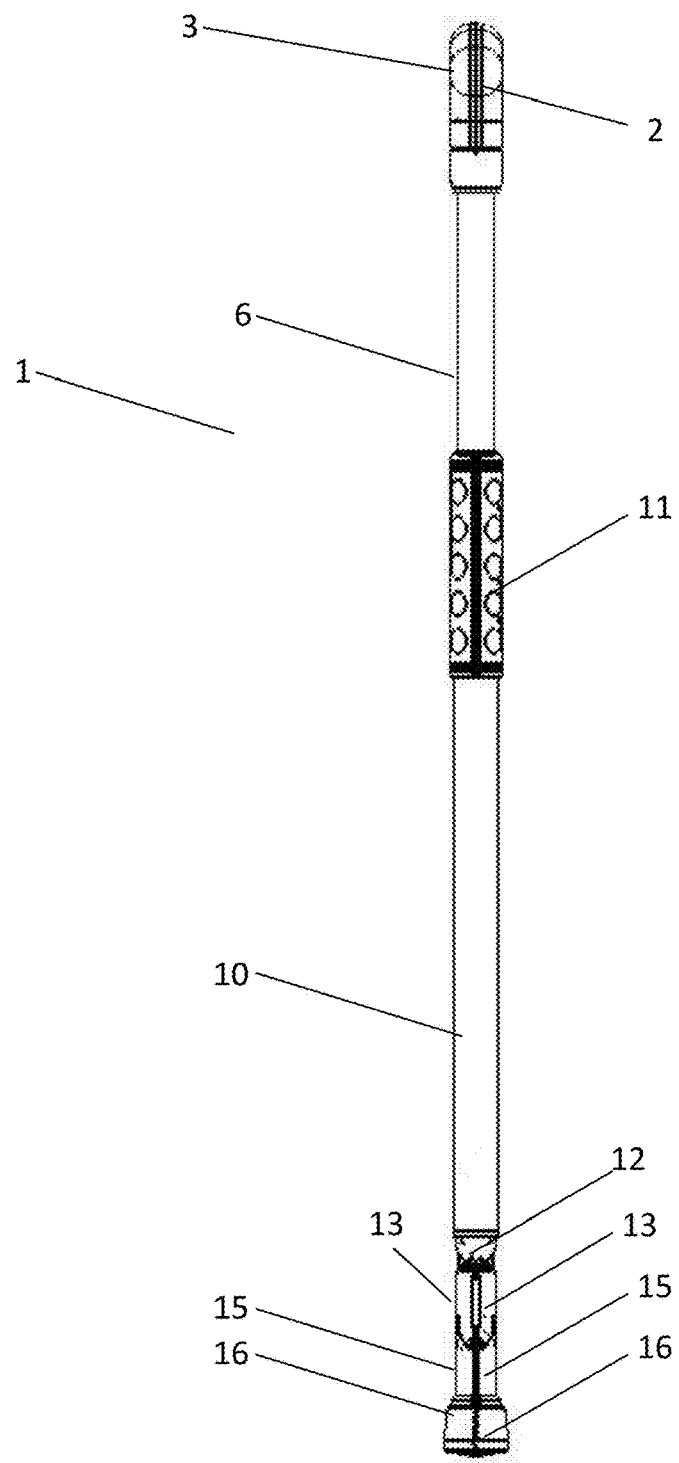
FIG. 13 illustrates a front view of the Handy Cane walking cane with the integrated grasper tool in the clamped configuration.

While several variations of the present invention have been illustrated by way of example in particular embodiments, it is apparent that further embodiments could be developed within the spirit and scope of the present invention, or the inventive concept of an improved walking cane with a concealable grasper tool. However, it is to be expressly understood that such modifications and adaptations are within the spirit and scope of the present invention, and are inclusive, but not limited to the following appended claims as set forth.

As illustrated in FIGS. 1-16, the subject invention is a lightweight, elongated, substantially-rigid walking cane 1 with a handle 2 on a proximal end 3, and an integrated grasper tool 4 on a ground contact distal end 5, for reaching and grabbing objects.

FIGS. 1-6 illustrate the cane 1 in the closed, locked configuration, for use as a stable, structurally sound walking cane 1. The cane 1 includes the curved handle 2, and the ground contact distal end 5 to provide physical support to a user while walking, standing, or sitting.

Figure 14:
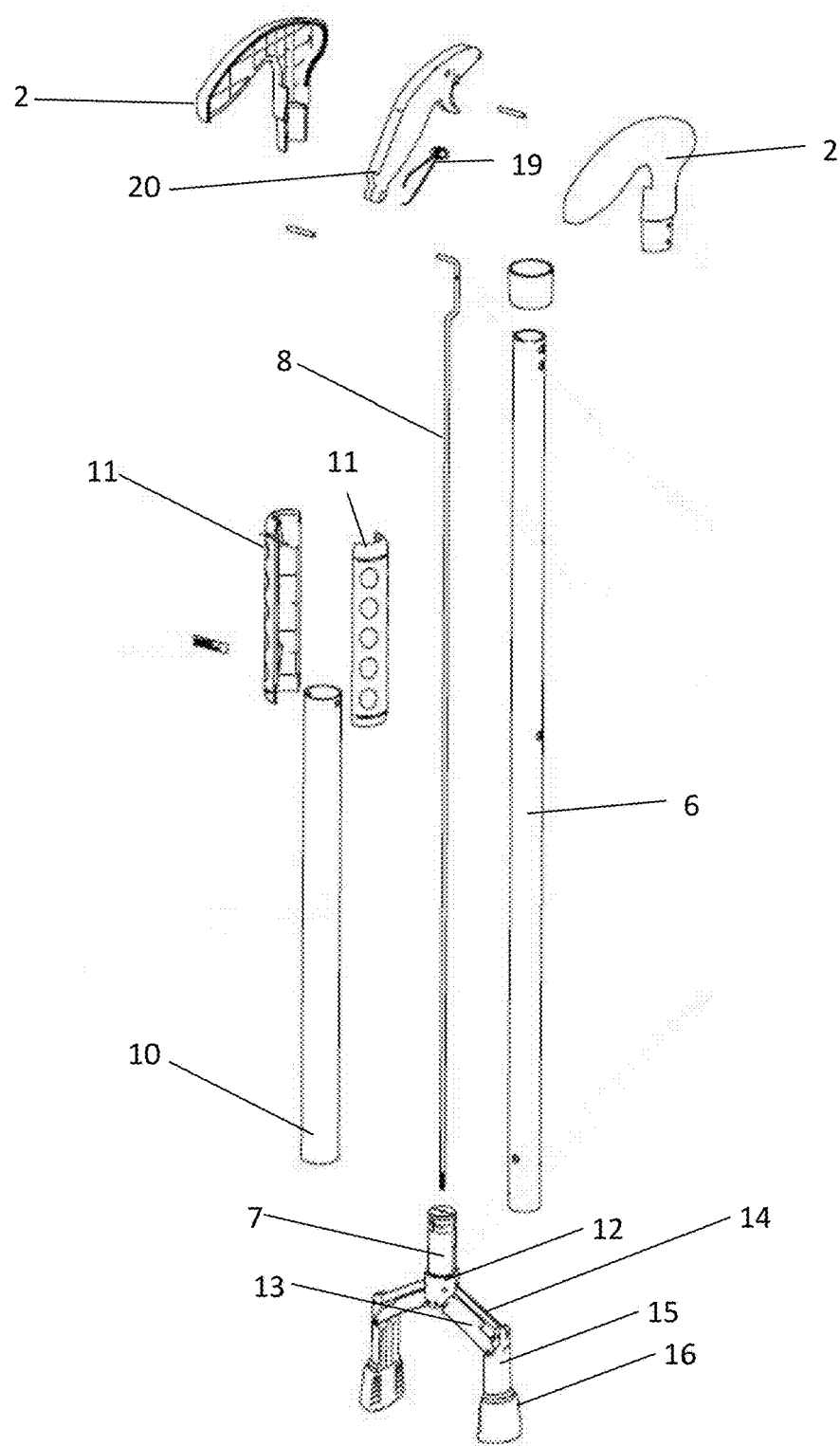
FIG. 14 illustrates an exploded view the Handy Cane walking cane.
Figure 15:
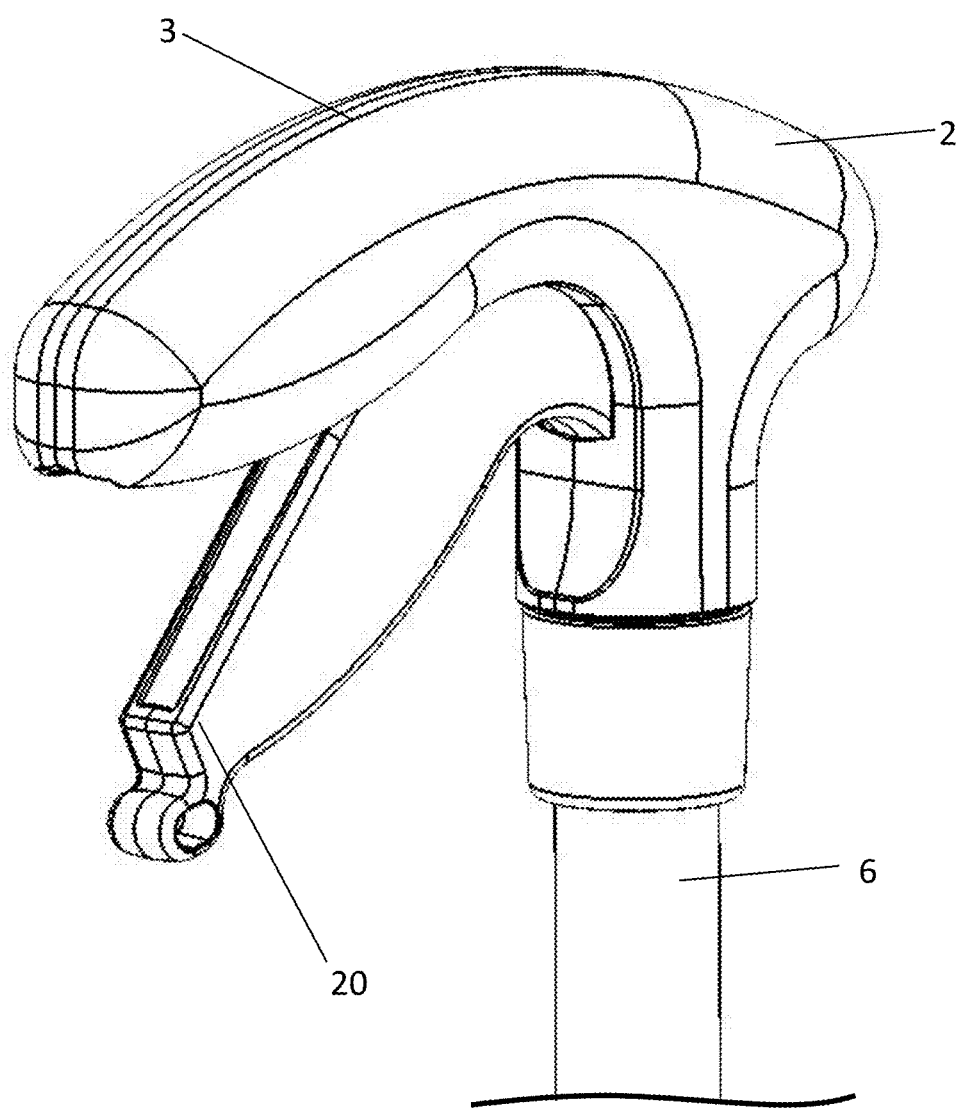
FIG. 15 illustrates an enlarged isometric view of the handle of the Handy Cane walking cane.
Figure 16:
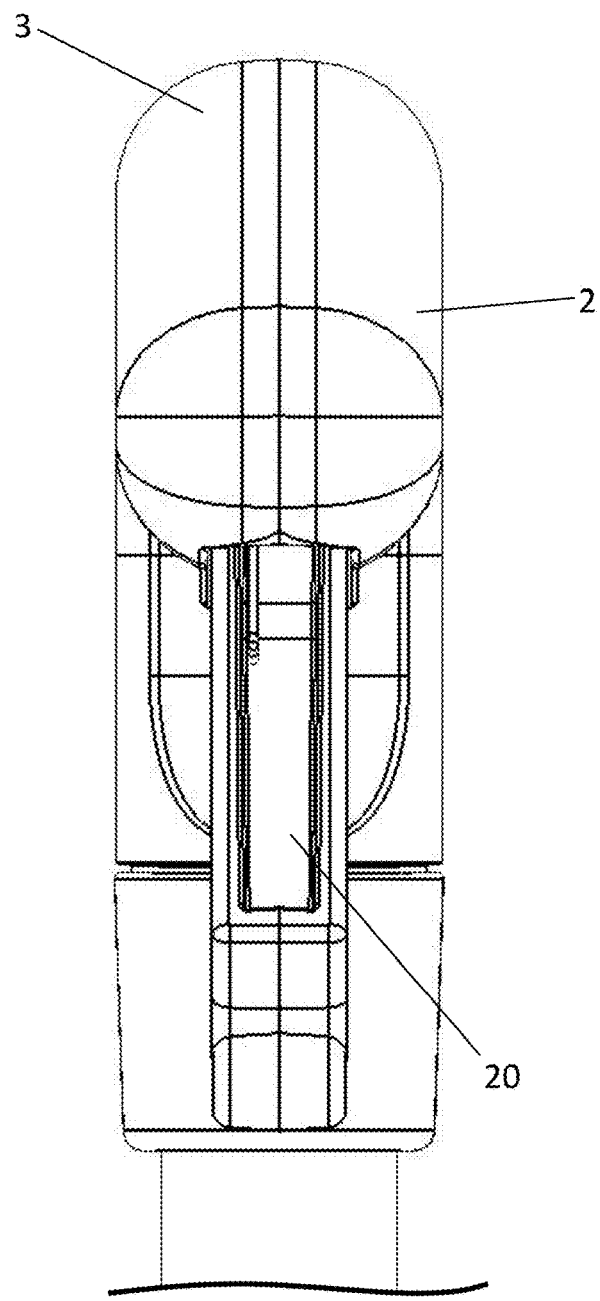
FIG. 16 illustrates an enlarged isometric view of the handle of the Handy Cane walking cane.
Figure 17:
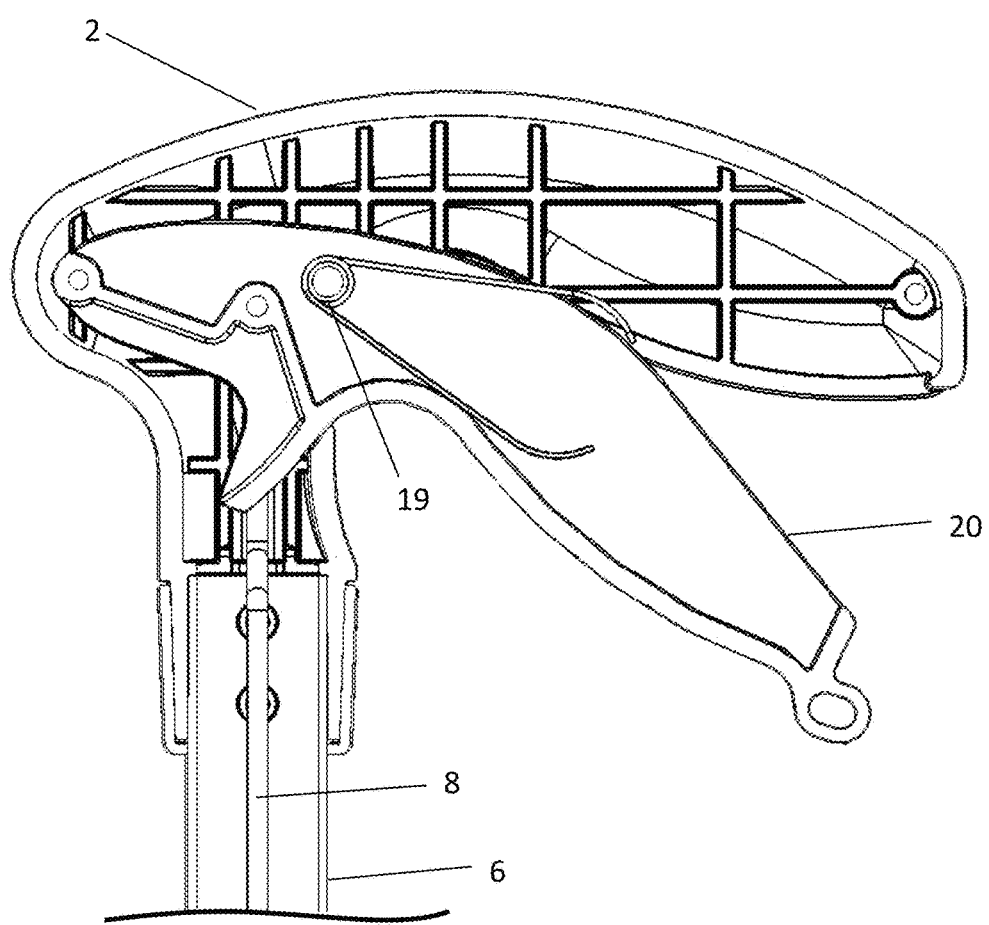
FIG. 17 illustrates an enlarged side cross-sectional view of the handle of the Handy Cane walking cane.
Figure 18:
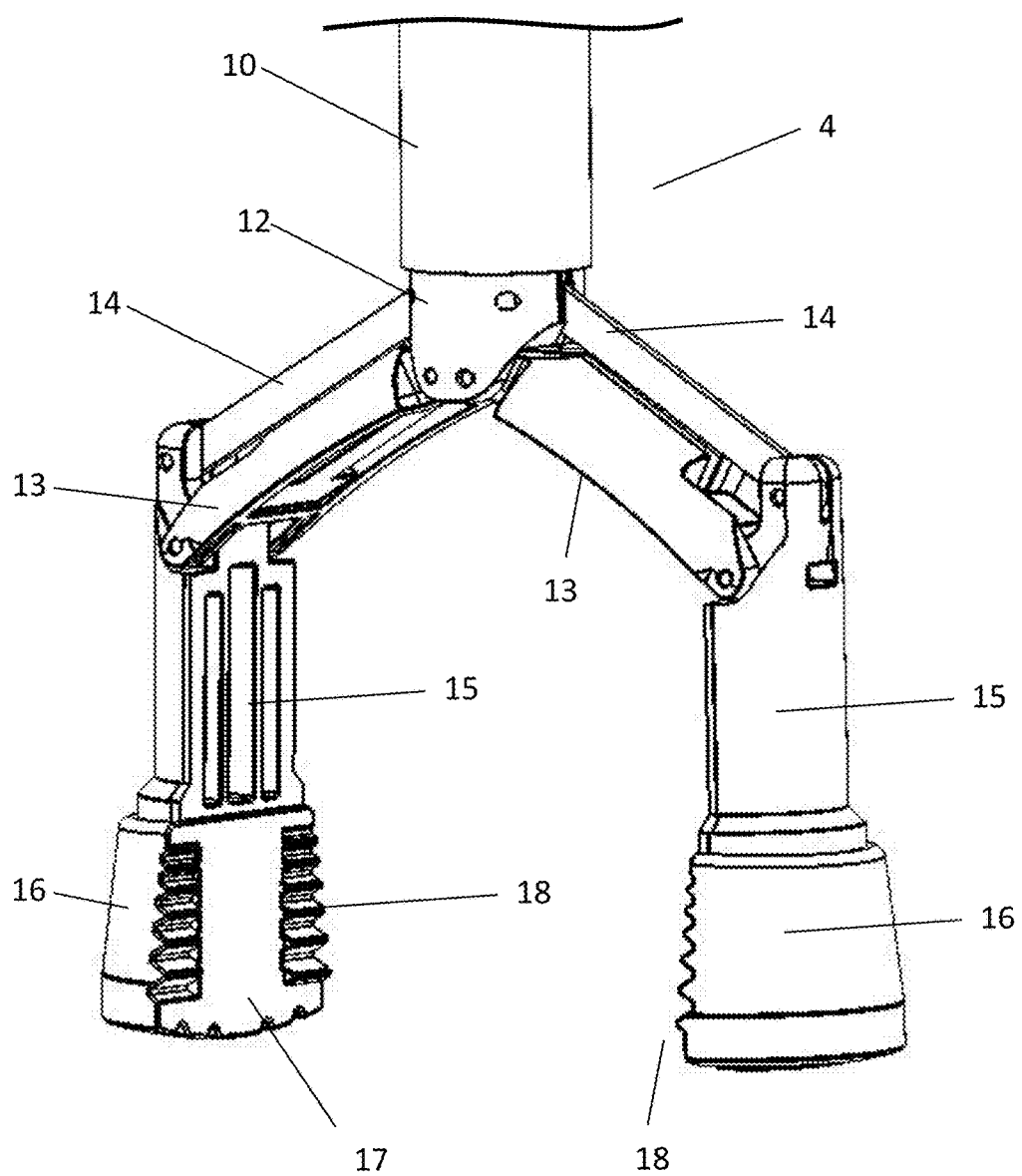
FIG. 18 illustrates an enlarged isometric view of the grasper tool of the Handy Cane walking cane in the open configuration.
Figure 19:
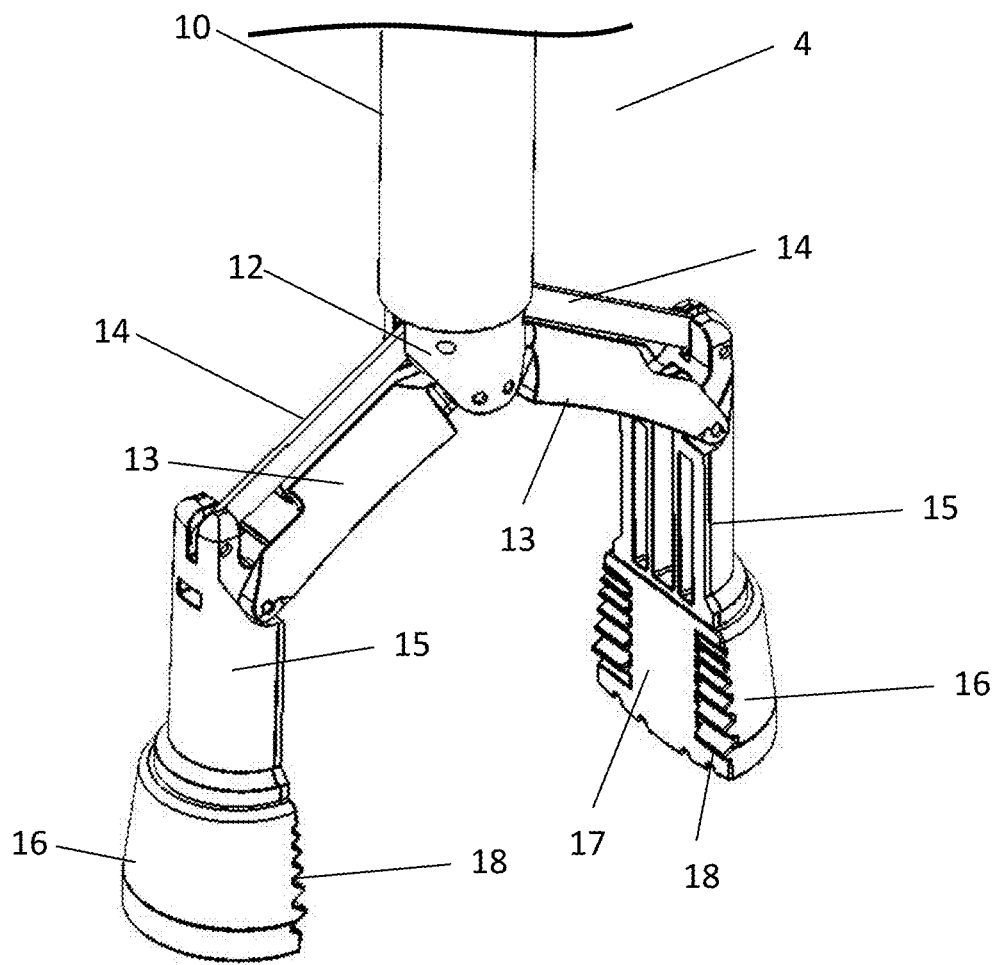
FIG. 19 illustrates another enlarged top isometric view of the grasper tool of the Handy Cane walking cane in the open configuration.
Figure 20:
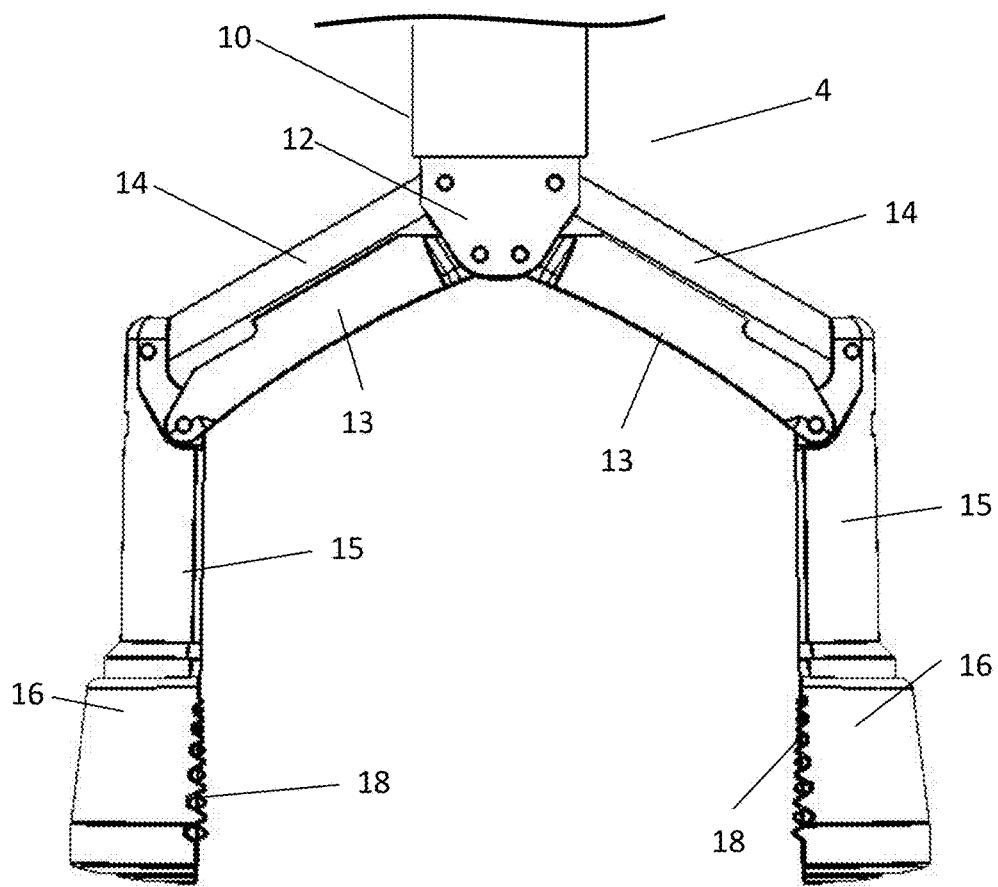
FIG. 20 illustrates an enlarged front view of the grasper tool of the Handy Cane walking cane in the open configuration.
Figure 21:
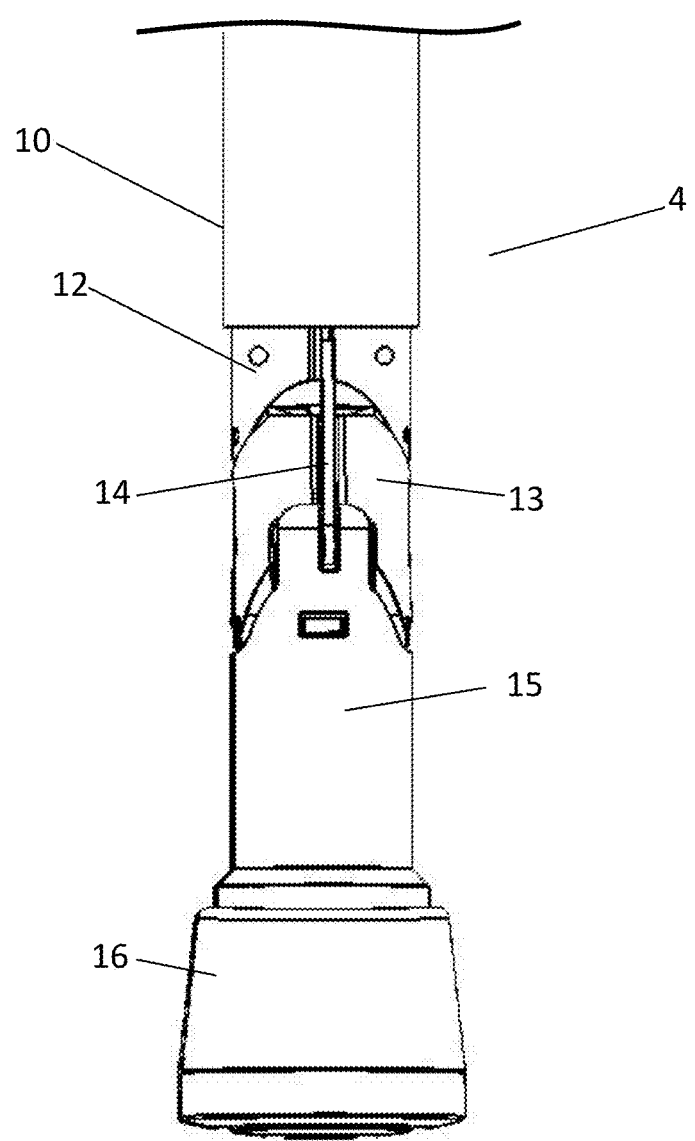
FIG. 21 illustrates an enlarged side view of the grasper tool of the Handy Cane walking cane in the open configuration.
Figure 22:
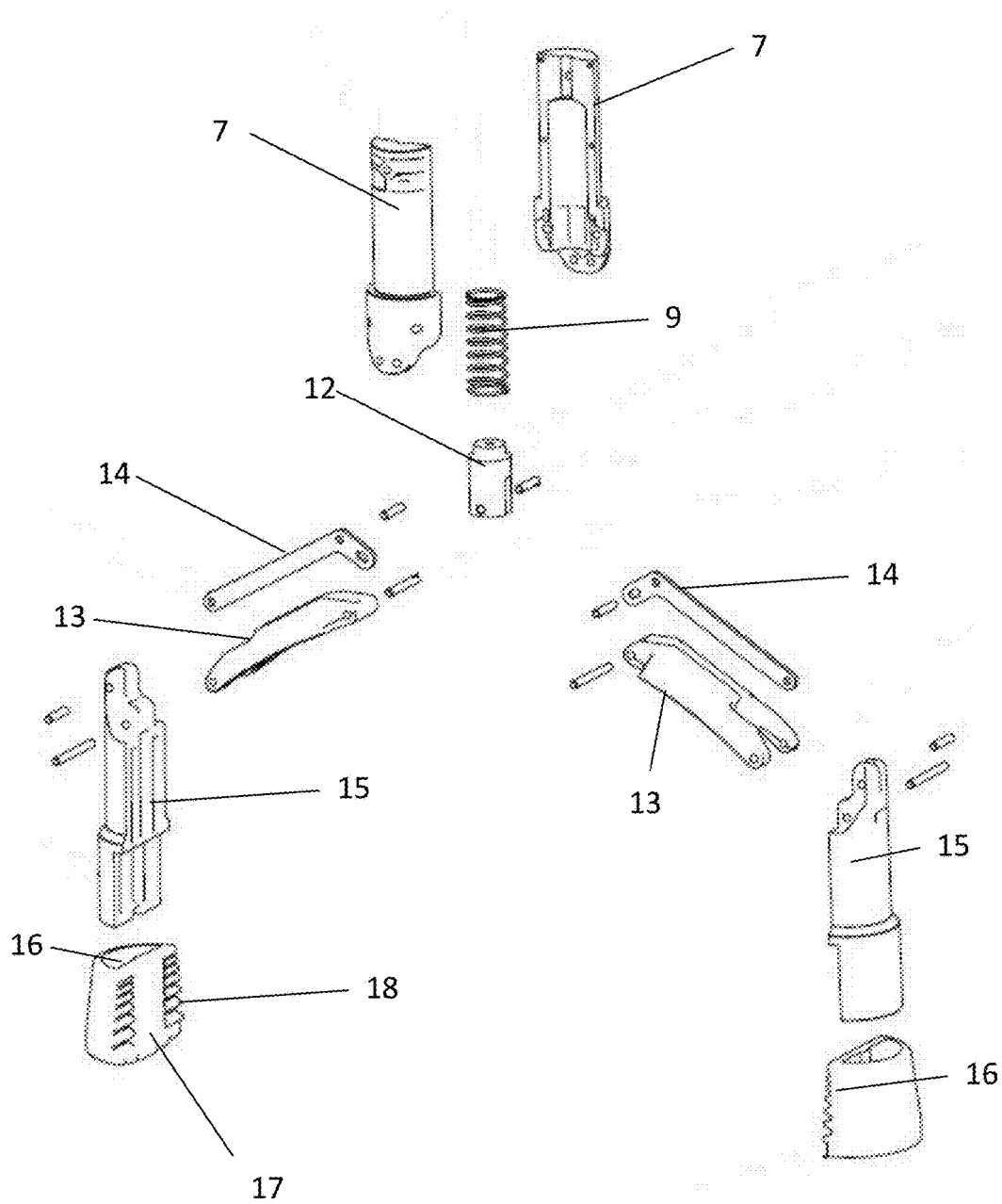
FIG. 22 illustrates an exploded view of the grasper tool of the Handy Cane walking cane.
Figure 23:
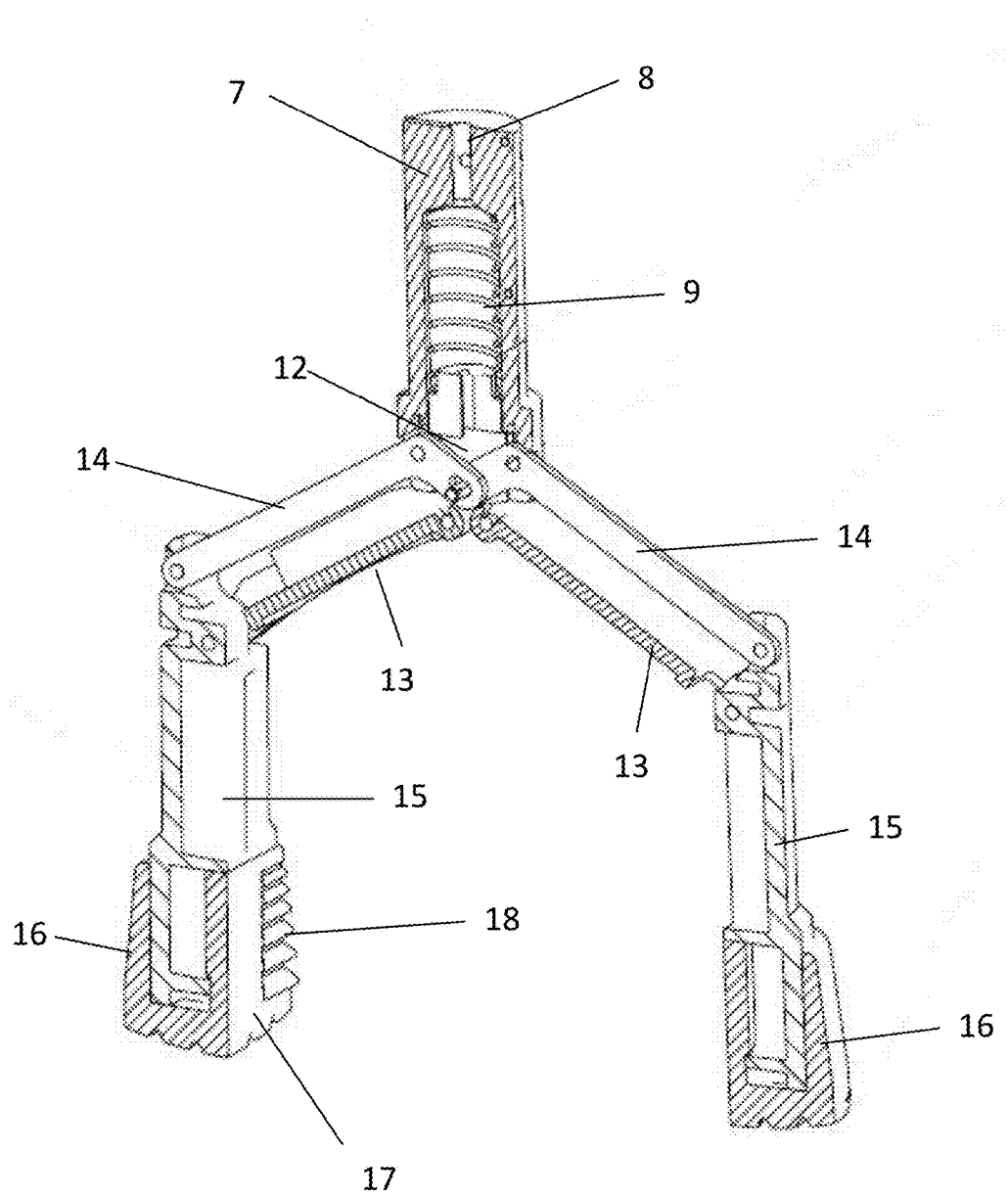
FIG. 23 illustrates a front cross-sectional view of the grasper tool of the Handy Cane walking cane in the open configuration.
Figure 24:
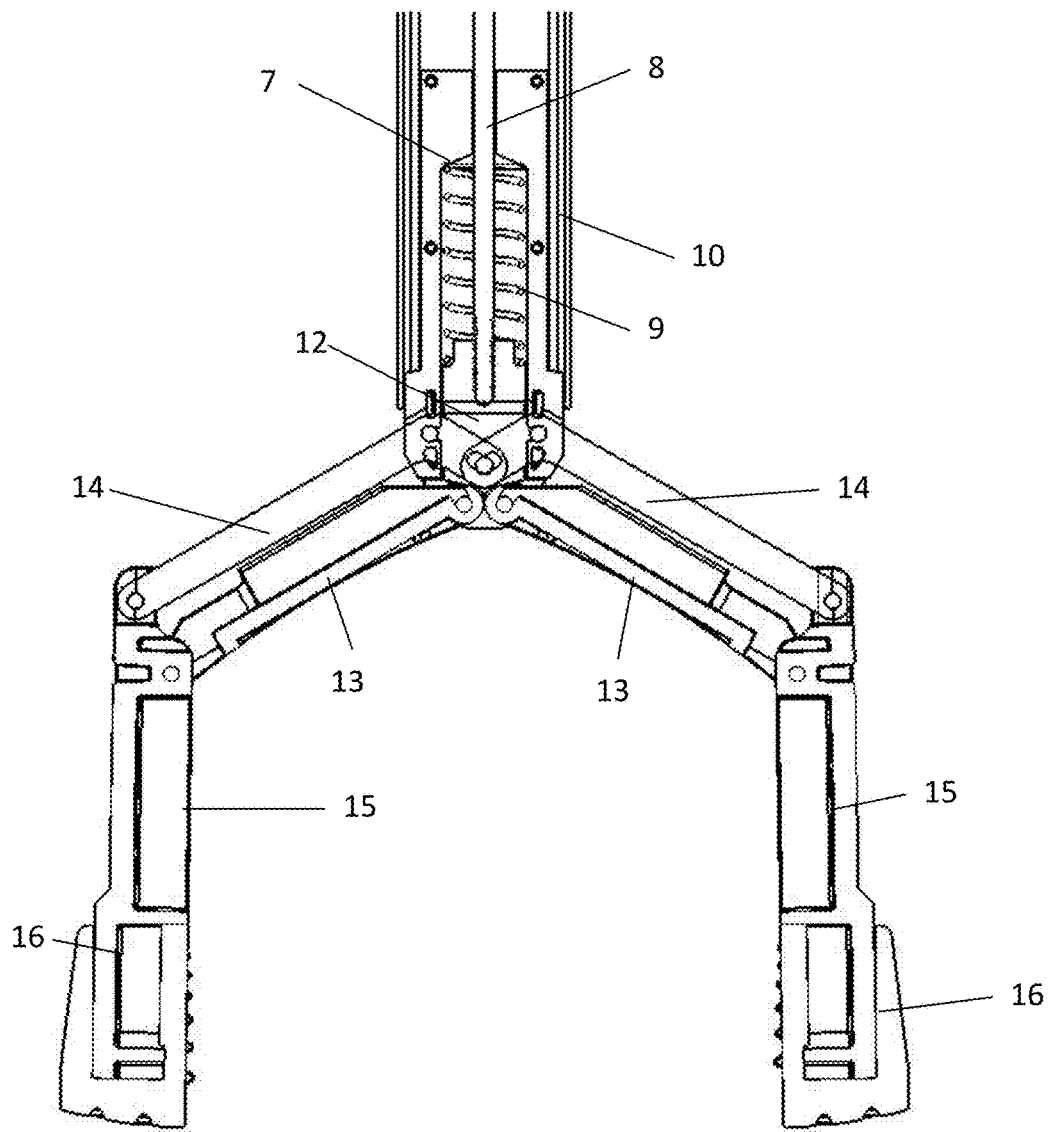
FIG. 24 illustrates another front cross-sectional view of the grasper tool of the Handy Cane walking cane in the open configuration.
Figure 25:
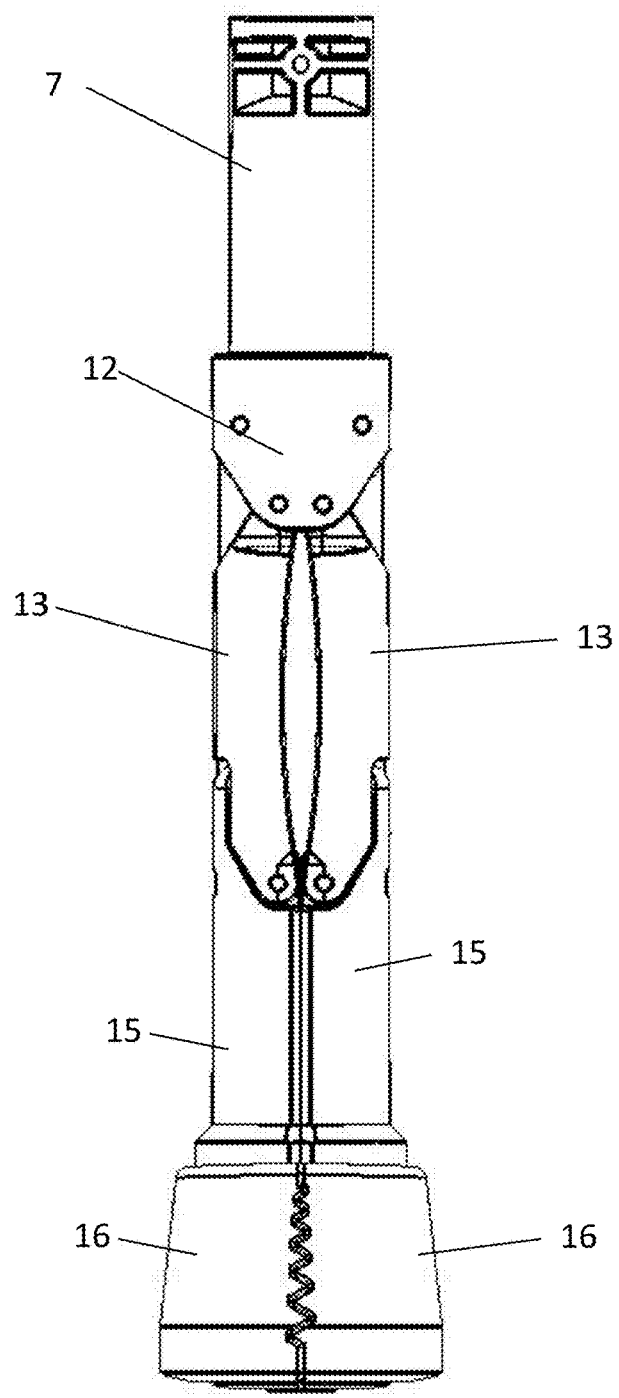
FIG. 25 illustrates an enlarged front view of the grasper tool of the Handy Cane walking cane in the clamped configuration.
Figure 26:
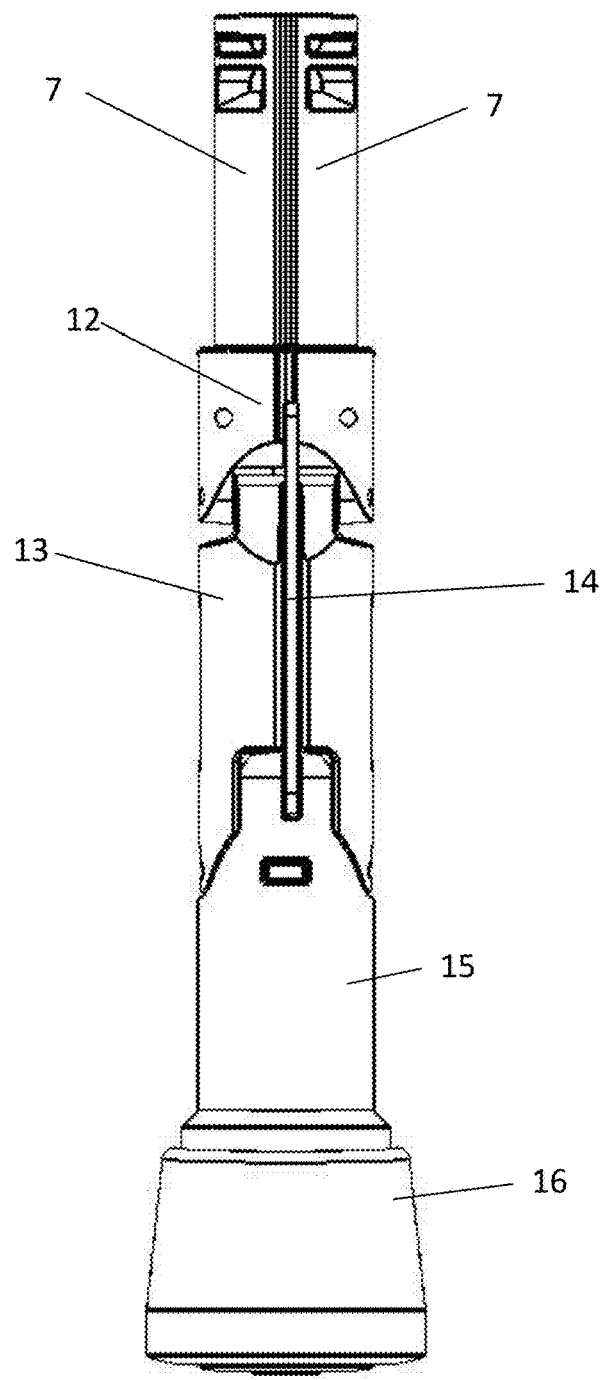
FIG. 26 illustrates an enlarged side view of the grasper tool of the Handy Cane walking cane in the clamped configuration.

The elongated body of the cane 1 is composed of a main support inner tube 6 that extends from the handle 2 on the proximal end 3 of the cane 1, to two half wrists 7 of the grasper tool 4 on the distal end 5 of the cane 1. As illustrated in FIG. 14, the main support inner tube 6 extends around an internal rod 8 that extends from the handle 2 to a grasper spring 9 within the two half-wrists 7 on the grasper tool 4. A slidable lower outer tube 10, proximate to the distal end 5 of the cane 1, extends around the lower portion of the main support inner tube 6. A slidable locking/unlocking sleeve 11, formed by two halves, extends around the proximal end of the lower outer tube 10 and the distal end of the inner tube. Each half of the sleeve 11 comprises imbedded proximal and distal detents.

The grasper tool 4 comprises two half wrists 7, the grasper spring 9, a grasper actuator 12, two proximal phalanges 13, two ligaments 14, two distal phalanges 15, and two half boots 16, wherein the two half boots 16 each have an internal face 17, wherein the internal faces have complementary interlocking shapes and ridges 18 for grasping objects. The bottom surfaces of the half boots 16 form the ground contact distal end 5 of the cane 1 in the closed configuration.

In the closed position of the cane 1, the distal end of the lower outer tubes 10 covers the two proximal phalanges 13, the two ligaments 14, and the two distal phalanges 15 to maintain the two proximal phalanges 13, the two ligaments 14, and the two distal phalanges 15 in a substantially straight position that is substantially parallel with each other and the main support inner tube 6. The complementary interlocking internal faces 17 of the two half boots 16 are joined so as to form the ground contact distal end 5 for the cane 1.

FIGS. 7-10 and 14-24 illustrate the cane 1 in the open, unlocked configuration, for use as a grasping tool. To achieve this unlocked configuration, the sleeve 11 is slid in a proximal direction on the main support inner tube 6. This sliding action also slides the lower outer tube 10 in a proximal direction on the main support inner tube 6. This sliding of the lower outer tube 10 uncovers the two proximal phalanges 13, the two ligaments 14, and the two distal phalanges 15, thereby releasing the two proximal phalanges 13, the two distal phalanges 15, and the two ligaments 14 of the grasper tool 4. This release activates the grasper actuator 12 to rotate the two proximal phalanges 13 and the two ligaments 14 outwardly away from the cane 1 axis, wherein the two proximal phalanges 13 and the two ligaments 14 rotate outwardly in a substantially aligned and parallel position with each other. The two distal phalanges 15 and the two half boots 16 extend outwardly away from the cane 1 in a substantially aligned and parallel position with each other while remaining parallel with the cane 1 axis. This movement further slides the grasper actuator 12 and the internal rod 8 distally away from the internal trigger spring 19, thereby releasing the trigger 20 on the handle 2 of the grasper tool 4. In this configuration, the grasper tool 4 is open, unlocked, and ready to grasp an object.

FIGS. 11-13, 25, and 26 illustrate the grasper tool 4 in a clamped, grasping position. The grasper tool 4 is moved to the clamped, grasping position by actuating the trigger 20 on the handle 2 to compress the internal trigger spring 19, thereby sliding the internal rod 8 in a proximal direction, which moves the distal end of the internal rod 8 distally away the grasping spring 9. This activates the grasper actuator 12 to rotate the two proximal phalanges 13 and the two ligaments 14 inwardly, toward the cane 1 axis, wherein the two proximal phalanges 13 and the two ligaments 14 retract inwardly in a substantially aligned and parallel position with each other. The two distal phalanges 15 and the two half boots 16 retract inwardly toward the cane 1 in a substantially aligned and parallel position with each other while remaining parallel with the cane 1 axis. As the trigger is fully squeezed, the two proximal phalanges 13, the two ligaments 14, and the two distal phalanges 15 are moved into a substantially straight position that is substantially parallel with each other and the main support inner tube 6. The complementary interlocking internal faces 17 of the two half boots 16 are joined so as to grasp a desired object.

Once the cane 1 is no longer needed for grasping an object, it is moved back into the closed configuration. The sleeve 11 is slid in a distal direction on the main support inner tube 6. This sliding action also slides the lower outer tube 10 in a distal direction on the main support inner tube 6. This sliding of the lower outer tube 10 covers the two proximal phalanges 13, the two ligaments 14, and the two distal phalanges 15, thereby closing the two proximal phalanges 13, the two distal phalanges 15, and the two ligaments 14 of the grasper tool 4. This closing activates the grasper actuator 12 to rotate the two proximal phalanges 13 and the two ligaments 14 inwardly towards the cane 1 axis, wherein the two proximal phalanges 13 and the two ligaments 14 retract inwardly in a substantially aligned and parallel position with each other. The two distal phalanges 15 and the two half boots 16 retract inwardly towards the cane 1 in a substantially aligned and parallel position with each other while remaining parallel with the cane 1 axis. This movement further slides the internal rod 8 proximally towards the internal trigger spring 19, thereby retracting the trigger 20 on the handle 2, In this configuration, the cane 1 is once more closed and ready to be used for stability and balance.

What is claimed is:

1. A lightweight walking cane with a concealable grasper comprising:
    a handle including a spring loaded trigger;
    the concealable grasper on a distal end of the cane, the grasper including a grasper actuator, two proximal phalanges, two distal phalanges, and two half boots;
    an internal rod attached to the spring loaded trigger and the grasper;
    a structural support tubing encircling the internal rod and extending from the handle to the grasper;
    a slidable sleeve on the structural support tubing;
    a slidable external tubing encircling the structural support tubing extending to the grasper, wherein the slidable external tubing is attached to the sleeve;
    wherein sliding the sleeve and the external tubing in a distal direction closes and locks the grasper of the cane by covering the two proximal phalanges and the two distal phalanges in a substantially straight position that is substantially parallel with each other and the structural support tubing, and the two half boots form a ground contact end for the cane;

further wherein sliding the sleeve and the external tubing in a proximal direction opens and unlocks the grasper by uncovering the two proximal phalanges and the two distal phalanges, and moves the internal rod toward the grasper releasing the spring loaded trigger and rotating the two proximal phalanges outwardly away from the cane in a substantially symmetrical position with each other, wherein the two distal phalanges and the two half boots extend outwardly away from the cane in a substantially symmetrical position with each other while remaining substantially parallel with the structural support tubing to form the open and unlocked grasper; and wherein in the unlocked grasper configuration, applying a force to pull the spring loaded trigger towards the handle moves the internal rod in a proximal direction to activate the grasper and retracts the two proximal phalanges, the two distal phalanges, and the two half boots inwardly in a substantially symmetrical positions with each other to grasp an object.

2. The walking cane of claim 1, wherein the grasper is moved back to the locked and closed configuration by sliding the sleeve and the external tubing in a distal direction on the structural support tubing to move the internal rod proximally to retract the spring loaded trigger and activate the grasper actuator to retract the two proximal phalanges and the two ligaments inwardly in a substantially symmetrical position with each other;

wherein the two distal phalanges and the two half boots retract inwardly towards the cane axis in a substantially symmetrical position with each other while remaining substantially parallel to each other and the structural support tubing; and wherein as the sleeve and external tubing are fully extended in a distal direction, the external tubing covers the two proximal phalanges, the two ligaments and the two distal phalanges in a substantially straight position that is substantially parallel with each other and the structural support tubing, and the complementary interlocking internal faces of the two half boots are joined so as to form the ground contact end for the cane.

3. The walking cane of claim 1, further comprising a skid-resistant spherical surface on the ground contact end of the cane.

4. The walking cane of claim 1, further comprising a plurality of complementary interlocking ridges on the internal faces of the two half boots.

5. The walking cane of claim 1, wherein the trigger comprises a non-slip gripping spherical surface.

6. A lightweight walking cane with a concealable grasper comprising:

a top handle on a proximal end of the cane, the handle including a spring loaded trigger;

the concealable grasper on a distal end of the cane, wherein the grasper comprises two wrist halfs, a grasper spring, a grasper actuator, two proximal phalanges, two ligaments, two distal phalanges, and two half boots, wherein the two half boots each have an internal face, wherein the internal faces have complementary interlocking shapes with each other;

an internal rod operatively attached to the spring loaded trigger, wherein the internal rod extends from the spring loaded trigger on a proximal end and is operatively attached to the grasper actuator on a distal end;

a structural support tubing having a cane axis encircling the internal rod and attached to the handle, wherein the structural support tubing extends in a substantially straight direction from the handle on a proximal end to the two wrist halfs on a distal end;

a slidable sleeve comprising two joint halves, each sleeve joint half comprising proximal and distal detents imbedded in sleeve joint halfs;

a slidable external tubing attached to sleeve joint halfs along structural support tubing, wherein the external tubing extends encircling the structural support tubing from the sleeve to the two wrist halfs on the distal end;

wherein in a closed and locked configuration of the grasper, the external tubing covers the two proximal phalanges, the two ligaments and the two distal phalanges in a substantially straight position that is substantially parallel with the structural support tubing, and the complementary interlocking internal faces of the two half boots are joined so as to form a ground contact end for the cane;

wherein sliding the sleeve and the external tubing in a proximal direction on the structural support tubing uncovers the two proximal phalanges, the two ligaments and the two distal phalanges, and releases them for opening the grasper by the grasper spring, wherein as the two ligaments rotate to the open position they slide the grasper actuator and the internal rod distally away from the spring loaded trigger, releasing the trigger on the handle and rotating the two proximal phalanges and the two ligaments outwardly away from the cane axis in a substantially symmetrical position to each other, further wherein the two distal phalanges and the two half boots extend outwardly away from the cane axis in a substantially symmetrical position with each other while remaining parallel with the structural support tubing to form an unlocked and open configuration of the grasper;

wherein in the unlocked and open configuration of the grasper, applying a force to pull the trigger towards the handle moves the internal rod proximally towards the spring loaded trigger to activate the grasper actuator and rotate the two proximal phalanges and the two ligaments inwardly in a substantially symmetric position with each other, and wherein the two distal phalanges and the two half boots close up inwardly towards the cane axis in a substantially symmetric position with each other while remaining parallel to the structural support tubing to grasp an object.

7. The walking cane of claim 6, wherein the grasper is moved back to the locked and closed configuration by sliding the sleeve and the external tubing in a distal direction on the structural support tubing to move the internal rod proximally to retract the spring loaded trigger and activate the grasper actuator to retract the two proximal phalanges and the two ligaments inwardly in a substantially symmetrical position with each other;

wherein the two distal phalanges and the two half boots retract inwardly towards the cane axis in a substantially symmetrical position with each other while remaining substantially parallel to each other and the structural support tubing; and wherein as the sleeve and external tubing are fully extended in a distal direction, the external tubing covers the two proximal phalanges, the two ligaments and the two distal phalanges in a substantially straight position that is substantially parallel with each other and the structural support tubing, and the complementary interlocking internal faces of the two half boots are joined so as to form the ground contact end for the cane.

8. The walking cane of claim 6, further comprising a skid-resistant spherical surface on the ground contact end of the cane.

9. The walking cane of claim 6, further comprising a plurality of complementary interlocking ridges on the internal faces of the two half boots.

10. The walking cane of claim 6, wherein the trigger comprises a non-slip gripping spherical surface.

11. A combination cane and grabber tool comprising:
an elongated cane body comprising a structural support tubing having a cane axis, a proximal end and a distal end;
a handle on the proximal end of the cane, the handle including a trigger;
a concealable grasper on a distal end of the cane, wherein the grasper comprises an actuator, a wrist, a first proximal phalange, a first ligament, a first distal phalange, a first half boot, a second proximal phalange, a second ligament, a second distal phalange, a second half boot; an internal rod operatively attached to the trigger at a proximal end, wherein the internal rod extends from the trigger on the proximal end and is operatively attached to actuator on a distal end;
a sleeve and a distal external tubing capable of sliding on the structural support tubing, wherein the sleeve and the external tubing are configured to slide proximally to unlock the grasper for opening;
wherein in a closed position of the grasper, the sleeve and the external tubing are detained in a distal position, further wherein the first proximal phalange, the first ligament, the first distal phalange, the second proximal phalange, the second ligament, and the second distal phalange are all covered by the external tubing in a substantially straight position that is substantially parallel with the structural support tubing, further wherein the first and second half boots each have an internal face that are complementary and interlocking to each other and are joined to form the ground support end for the cane;
wherein an unlocked position of the grasper is achieved by sliding the sleeve and the external tubing in the proximal direction, which uncovers the first proximal phalange, the first ligament, the first distal phalange, the second proximal phalange, the second ligament, and the second distal phalange, wherein the internal rod is moved in a distal direction to allow the actuator to open the grasper by rotating the first proximal phalange and the first ligament outwardly away from the cane axis, and rotating the second proximal phalange and the second ligament outwardly away from the cane axis, wherein the first proximal phalange and the first ligament extend outwardly in a direction that is opposite to the outward direction of the second proximal phalange and the second ligament, wherein the distal movement of the internal rod also rotates the trigger away from the handle;
wherein when the trigger is pulled towards the handle with force, pulling the internal rod in the proximal direction, which activates the actuator to rotate the first proximal phalange and the first ligament inwardly towards the cane axis, and rotates the second proximal phalange and the second ligament inwardly towards the cane axis, wherein the first proximal phalange and the first ligament rotate inwardly in a direction that is substantially aligned and opposite to the inward direction of the second proximal phalange and the second ligament thereby closing the grasper; and
wherein the first distal phalange and the first half boot move inwardly towards the cane axis, and the second distal phalange and the second half boot move inwardly towards the cane axis, in parallel to the cane axis.

12. The walking cane of claim 11, further comprising a skid-resistant spherical surface on the ground contact end of the cane.

13. The walking cane of claim 11, further comprising a plurality of complementary interlocking ridges on the internal faces of the two half boots.

14. The walking cane of claim 11, wherein the trigger comprises a non-slip gripping spherical surface.

* * * * *